United States Patent
Takahashi et al.

(10) Patent No.: US 11,230,564 B2
(45) Date of Patent: *Jan. 25, 2022

(54) METHOD FOR PRODUCING PHOSPHORYL IMIDE SALT, METHOD FOR PRODUCING NONAQUEOUS ELECTROLYTE SOLUTION CONTAINING SAID SALT, AND METHOD FOR PRODUCING NONAQUEOUS SECONDARY BATTERY

(71) Applicant: CENTRAL GLASS CO., LTD., Yamaguchi (JP)

(72) Inventors: Mikihiro Takahashi, Ube (JP);
Takayoshi Morinaka, Ube (JP);
Masutaka Shinmen, Sanyo-onoda (JP);
Ryosuke Terada, Ube (JP)

(73) Assignee: CENTRAL GLASS CO., LTD., Yamaguchi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/086,924

(22) Filed: Nov. 2, 2020

(65) Prior Publication Data
US 2021/0054005 A1 Feb. 25, 2021

Related U.S. Application Data

(62) Division of application No. 16/603,866, filed as application No. PCT/JP2018/014944 on Apr. 9, 2018, now Pat. No. 10,851,124.

(30) Foreign Application Priority Data

Apr. 10, 2017 (JP) .................. 2017-077293

(51) Int. Cl.
| C07F 9/26 | (2006.01) |
| C07F 9/24 | (2006.01) |
| H01G 9/035 | (2006.01) |
| H01M 10/0525 | (2010.01) |
| H01M 10/0567 | (2010.01) |
| H01M 10/0568 | (2010.01) |

(52) U.S. Cl.
CPC ............ *C07F 9/26* (2013.01); *C07F 9/2483* (2013.01); *C07F 9/2495* (2013.01); *H01G 9/035* (2013.01); *H01M 10/0525* (2013.01); *H01M 10/0567* (2013.01); *H01M 10/0568* (2013.01); *H01M 2300/0025* (2013.01)

(58) Field of Classification Search
None
See application file for complete search history.

(56) References Cited

U.S. PATENT DOCUMENTS 10,424,794 B2    9/2019   Takahashi et al.
10,851,124 B2 *  12/2020  Takahashi ......... H01M 10/0567

2004/0097757 A1   5/2004   Cernik et al.
2011/0034716 A1   2/2011   Okumura et al.
2011/0160106 A1   6/2011   Michot et al.
2013/0323155 A1   12/2013  Tsubokura et al.
2016/0016797 A1   1/2016   Maekawa
2017/0204124 A1   7/2017   Takahashi et al.
2018/0034103 A1   2/2018   Kubo et al.

FOREIGN PATENT DOCUMENTS

| CN | 101654229 | 2/2010 |
| EP | 3165528 | 5/2017 |
| JP | 4198992 | 12/2008 |
| JP | 2010-168308 | 8/2010 |
| JP | 2013-241353 | 12/2013 |

(Continued)

OTHER PUBLICATIONS

Extended European Search Report dated Dec. 7, 2020 in corresponding European Patent Application No. 18783925.3.
"Dichloromethane" International Agency for Research on Cancer, 1999, pp. 251-315, XP55748413.
International Search Report dated Jun. 19, 2018 in International (PCT) Application No. PCT/JP2018/014944.
Fluck et al., "Bis(difluorphosphoryl)amin und einige N-Derivate", Z. Anorg. Allg. Chem., vol. 412, 1975, pp. 65-70.
Rovnanik et al., "Syntheses of Phosphoryl Chloro- and Bromofluorides and Crystal Structures of $POFCl_2$ and $POF_2Cl$", Z. Anorg. Allg. Chem., vol. 632, 2006, pp. 1356-1362.
Acharya et al., "Trichloroisocyanuric acid: an efficient reagent for the synthesis of dialkyl chlorophosphates from dialkyl phosphites", Tetrahedron Letters, vol. 46, 2005, pp. 5293-5295.
Appel et al., "Hydrazinsulfonsaure-amide, I. Über das Hydrazodisulfamid", Chem. Ber., vol. 91, No. 6, 1958, pp. 1339-1341, cited in specification.

(Continued)

*Primary Examiner* — Amy C Bonaparte
(74) *Attorney, Agent, or Firm* — Wenderoth, Lind & Ponack, L.L.P.

(57) ABSTRACT

To provide a method for producing a phosphoryl imide salt represented by the following general formula (1) at a satisfactory yield by cation exchange. The method comprises the step of performing cation exchange by bringing a phosphoryl imide salt represented by the following general formula (2) into contact with a cation exchange resin having $M^{1\ n+}$ or a metal salt represented by the general formula (4) in an organic solvent having a water content of 0.3% by mass or less.

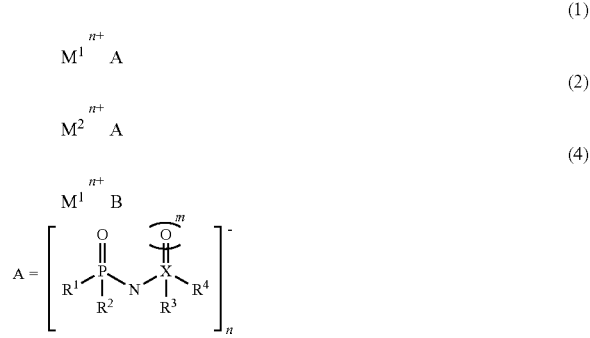

18 Claims, No Drawings

(56) References Cited

FOREIGN PATENT DOCUMENTS

| | | |
|---|---|---|
| JP | 5723439 | 5/2015 |
| JP | 2016-15214 | 1/2016 |
| JP | 2016-27028 | 2/2016 |
| JP | 2016-157679 | 9/2016 |
| WO | 2016/002481 | 1/2016 |
| WO | 2016/002774 | 1/2016 |
| WO | 2016/088766 | 6/2016 |
| WO | 2016/133169 | 8/2016 |

\* cited by examiner

METHOD FOR PRODUCING PHOSPHORYL IMIDE SALT, METHOD FOR PRODUCING NONAQUEOUS ELECTROLYTE SOLUTION CONTAINING SAID SALT, AND METHOD FOR PRODUCING NONAQUEOUS SECONDARY BATTERY

TECHNICAL FIELD

The present invention relates to a method for producing phosphoryl imide salt, a method for producing a nonaqueous electrolyte solution containing the salt, and a method for producing a nonaqueous secondary battery.

BACKGROUND ART

In a battery which is an electrochemical device, much attention has been paid in recent years to power storage systems to be applied for small apparatuses that need high energy density, such as information-related apparatuses or communication apparatuses, specifically, personal computers, video cameras, digital cameras, mobile phones, smartphones, electric tools and the like; and power storage systems to be applied for large apparatuses that need power, such as electric vehicles, hybrid vehicles, auxiliary power for fuel cell vehicles, energy storage and the like. Examples of a candidate thereof include non-aqueous electrolyte batteries such as a lithium ion battery, a lithium battery, a lithium ion capacitor, and more innovative battery such as a lithium sulfur battery, a sodium ion battery or a magnesium ion battery.

To achieve high performances, intensive study has been made on these nonaqueous electrolyte batteries, using bissulfonyl imide salts (their counter cation is lithium, sodium, magnesium, etc.) such as a bis(trifluoromethanesulfonyl)imide salt, a bis(fluorosulfonyl)imide salt and a (fluorosulfonyl) (trifluoromethanesulfonyl)imide salt in place of current main electrolytes such as hexafluorophosphate (lithium salt, sodium salt) and Grignard reagent (magnesium salt).

An attempt has been made to use these bissulfonyl imide salts as a solvent, not as a main electrolyte of a nonaqueous electrolyte solution but as an ionic liquid (their counter cation is a quaternary ammonium salt, or a composite of an imide Li salt and a glycol-based ether), and various studies have been made on the use of bissulfonyl imide salts as an additive for the formation of SEI to protect an electrode surface.

Under this background, in Patent Document 1, the present applicant has made it clear that addition of not a bissulfonyl imide salt in which two sulfonyl groups are linked via nitrogen, but a phosphoryl imide salt in which two phosphoryl groups are linked via nitrogen to nonaqueous electrolyte solution enables inhibition of the amount of gas generated during charge/discharge cycles.

In Patent Documents 2 and 3, the present applicant also has made it clear that use of a phosphoryl imide salt in which a sulfonyl group and a phosphoryl group are linked via nitrogen in combination with an ionic composite achieves an excellent high-temperature durability, and that use of a phosphoryl imide salt in which a sulfonyl group and a phosphoryl group are linked via nitrogen in combination with vinylsilane achieves not only excellent cycle characteristics at 50° C. or higher but also excellent low-temperature output characteristics.

PRIOR ART DOCUMENTS

Patent Documents

Patent Document 1: JP 2016-015214 A
Patent Document 2: JP 2016-027028 A
Patent Document 3: JP 2016-157679 A
Patent Document 4: JP 4198992 B1
Patent Document 5: JP 5723439 B1
Patent Document 6: JP 2010-168308 A
Patent Document 7: JP 2013-241353 A Non-Patent Documents Non-Patent Document 1: Z. Anorg. Allg. Chem. 412(1), 65-70 (1975)
Non-Patent Document 2: Z. Anorg. Allg. Chem. 632(7), 1356-1362 (2006)
Non-Patent Document 3: TETRAHEDRON LETT. 46(32), 5293-5295 (2005)
Non-Patent Document 4: Chem. Ber. 91(6), 1339-1341 (1958)

DISCLOSURE OF THE INVENTION

Problems to be Solved by the Invention

By reacting a phosphoric acid amide with a phosphoryl halide or a sulfonyl halide in the presence of an organic base, it is possible to obtain a phosphoryl imide tertiary ammonium salt (in this case, tertiary ammonium as a cation is a protonated form of the organic base used). To obtain a phosphoryl imide salt (its cation is lithium, sodium, potassium, magnesium, quaternary ammonium, etc.), exchanging the cation of the phosphoryl imide tertiary ammonium salt is considered as a general technique.

In this connection, various synthesis methods are disclosed for the bissulfonyl imide salt (its counter cation is an alkali metal) which is not a phosphoryl imide salt but has a similar structure; for example, Examples 1 to 3 of Patent Document 5 disclose that a bis(fluorosulfonyl)imide ammonium salt is dissolved in butyl acetate, and an aqueous potassium hydroxide solution, an aqueous lithium hydroxide solution or an aqueous sodium hydroxide solution is added thereto and then the resulting mixture is heated to reflux under reduced pressure, thus making it possible to exchange the counter cation of the imide salt to potassium, lithium or sodium from ammonium.

Patent Document 6 mentions that it is possible to convert into a bis(fluorosulfonyl)imide salt (its counter cation is an alkali metal) by treating a bis(fluorosulfonyl)imide salt (its counter cation is an onium) dissolved in water with a cation exchange resin, and Synthesis Example 9 discloses that a bis(fluorosulfonyl)imide triethylammonium salt is dissolved in butyl acetate and an aqueous lithium hydroxide solution is added thereto and then the aqueous phase is removed, and thus a high-purity lithium bis(fluorosulfonyl) imide is included in the remaining organic phase.

Example 1 of Patent Document 7 discloses a technique in which cation exchange is performed by treating a bis(fluorosulfonyl)imide triethylammonium salt with an aqueous potassium hydroxide solution, and then water and triethylamine liberated are distilled off and crystals are precipitated in isopropanol to produce a high-purity potassium bis(fluorosulfonyl)imide.

As mentioned above, with regard to a bissulfonyl imide salt, it is common to carry out cation exchange in a solvent system containing water in order to exchange the counter cation to an alkali metal.

However, when the above-mentioned conventional method was applied to the production of the phosphoryl imide salt, a large problem such as very low yield occurred.

When the cation is lithium, sodium or potassium, the phosphoryl imide salt is obtained by reacting a phosphoric acid amide with a phosphoryl halide or sulfonyl halide in the presence of an inorganic base (lithium hydride or sodium hydride or potassium hydride). However, since these metal hydrides are expensive, this technique is not an industrially usable technique.

Patent Document 4 (Example 5) discloses that potassium bis(difluorophosphoryl)imide in which all substituents are fluorine among phosphoryl imide salts can be obtained by fluorination with potassium fluoride of bis(dichlorophosphoryl)imide. However, even if the fluorination with potassium fluoride proceeds, the fluorination with lithium fluoride, sodium fluoride and magnesium fluoride does not easily proceed, so that it is impossible to directly obtain a lithium cation form, a sodium cation form and a magnesium cation form of the bis(difluorophosphoryl)imide salt by this technique.

When a lithium salt, a sodium salt or a magnesium salt of bis(dichlorophosphoryl)imide is fluorinated with potassium fluoride, the cation of the bis(difluorophosphoryl)imide salt as the product is changed into a mixture of the original cation (lithium, or sodium, or magnesium) and potassium, thus it is impossible to obtain the objective bis(difluorophosphoryl)imide salt having metal cations with high purity.

Non-Patent Document 1 discloses that lithium bis(difluorophosphoryl)imide can be obtained by the reaction between phosphorus oxyfluoride and lithium hexamethyldisilazide. However, this technique is not an industrially usable technique because it is necessary to use phosphorus oxyfluoride which is not easily available and has high toxicity, and expensive lithium hexamethyldisilazide.

In light of the above circumstances, the present invention has been made and an object thereof is to provide a method for producing a phosphoryl imide salt having a predetermined structure in a satisfactory yield by cation exchange. Another object thereof is to provide a method for efficiently producing a nonaqueous electrolyte solution including a phosphoryl imide salt having a predetermined structure through the cation exchange, and a method for producing a nonaqueous secondary battery.

Means for Solving the Problems

The present inventors have intensively studied to solve the above problems, and found that the objective phosphoryl imide salt is obtained at a satisfactory yield by performing a cation exchange reaction in an organic solvent having a water content of 0.3% by mass or less. It is possible to determine a water content in the organic solvent, for example, by conventional Karl Fischer titration.

Thus, the present invention is directed to a method for producing a phosphoryl imide salt represented by the following general formula (1), which includes the step of performing cation exchange by bringing a phosphoryl imide salt represented by the following general formula (2) into contact with a cation exchange resin having $M^{1\ n+}$ (hereinafter sometimes referred to as "cation exchange resin" or simply referred to as "ion exchange resin") or a metal salt represented by the general formula (4) in an organic solvent having a water content of 0.3% by mass or less:

 (1)

 (2)

 (4)

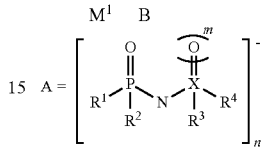

wherein $M^{1\ n+}$ is an alkali metal cation, an alkaline earth metal cation, a quaternary ammonium cation or a quaternary phosphonium cation, $M^{2\ n+}$ is any one of an alkali metal cation, an alkaline earth metal cation, a quaternary ammonium cation, a tertiary ammonium cation (a protonated form of a tertiary organic base), or a mixture thereof, a cation $M^{1\ n+}$ of the resultant product is different from a cation $M^{2\ n+}$ of the raw material, N is a nitrogen atom, P is a phosphorus atom, and X is a sulfur atom or a phosphorus atom, n is 1 or 2, when X is a sulfur atom, m is 2 and $R^4$ is absent, when X is a phosphorus atom, m is 1, B is a chloride ion, a sulfate ion, a sulfonate ion or a carbonate ion, and $R^1$, $R^2$, $R^3$ and $R^4$ are each independently selected from a fluorine atom, an alkyl group, an alkoxy group, an alkenyl group, an alkenyloxy group, an alkynyloxy group and an aryloxy group.

A water content of the organic solvent is preferably 0.05% by mass or less.

$M^{1\ n+}$ is preferably a lithium ion, a sodium ion, a potassium ion, a magnesium ion, a calcium ion, a tetraalkylammonium cation, a tetraalkylphosphonium cation, an imidazolium cation, a pyrazolium cation, a pyridinium cation or a pyrimidinium cation.

It is preferable that $M^{1\ n+}$ is a lithium ion and a water content of the organic solvent is 0.0001 to 0.03% by mass.

It is preferable that $M^{1\ n+}$ is a sodium ion and a water content of the organic solvent is 0.001 to 0.05% by mass.

$M^{2\ n+}$ is preferably a proton adduct of an aliphatic tertiary amine.

The proton adduct of an aliphatic tertiary amine is preferably a proton adduct of triethylamine, a proton adduct of tri-n-butylamine or a 2 equivalent proton adduct of tetramethylethylenediamine.

B is preferably a chloride ion, a sulfate ion or a carbonate ion.

It is preferable that $R^1$ and $R^2$ are each independently a methoxy group or a fluorine atom, $R^3$ is a trifluoromethyl group, a methyl group, a vinyl group, a methoxy group, a propargyloxy group, a 1,1,1,3,3,3-hexafluoroisopropoxy group, a trifluoroethoxy group or a fluorine atom, and $R^4$ is a fluorine atom.

The cation exchange resin is preferably a cation exchange resin having a sulfonate group.

The organic solvent is preferably at least one selected from the group consisting of carbonate esters, chain esters, ethers and ketones.

It is preferable that the carbonate esters are selected from the group consisting of dimethyl carbonate, ethyl methyl carbonate and diethyl carbonate, the chain esters are selected from the group consisting of methyl acetate, ethyl acetate, methyl propionate and ethyl propionate, the ethers are selected from the group consisting of tetrahydrofuran, diethylene glycol dimethyl ether, diethylene glycol diethyl ether, triethylene glycol dimethyl ether, tetraethylene glycol dimethyl ether and 1,2-dimethoxyethane, and the ketones are selected from the group consisting of acetone and ethyl methyl ketone.

It is preferable to include the steps of:

mixing with an organic base, a mixture which has been previously prepared by mixing a phosphoric acid amide having a group selected from a fluorine atom, an alkyl group, an alkoxy group, an alkenyloxy group, an alkynyloxy group and an aryloxy group, with a sulfonyl halide having a fluorine atom, an alkyl group, an alkoxy group, an alkenyloxy group, an alkynyloxy group or an aryloxy group, or mixing with a phosphoric acid amide having a group selected from a fluorine atom, an alkyl group, an alkoxy group, an alkenyloxy group, an alkynyloxy group and an aryloxy group, a mixture which has been previously prepared by mixing a sulfonyl halide having a fluorine atom, an alkyl group, an alkoxy group, an alkenyloxy group, an alkynyloxy group or an aryloxy group, with an organic base, before the cation exchange step of the above method for producing a phosphoryl imide salt.

The present invention is also directed to a method for producing a nonaqueous electrolyte solution, comprising dissolving at least the phosphoryl imide salt produced by the method for producing a phosphoryl imide salt and a solute in a nonaqueous solvent.

The solute is preferably at least one selected from the group consisting of $LiPF_6$, $LiBF_4$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$, $LiSO_3F$, $NaPF_6$, $NaBF_4$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaSO_3F$, $NaN(CF_3SO_2)_2$ and $NaN(CF_3SO_2)(FSO_2)$.

The amount of the phosphoryl imide salt to be added is preferably in a range of 0.005 to 12.0% by mass based on the total amount of the nonaqueous solvent, the solute and the phosphoryl imide salt.

It is preferable to further add at least one additive selected from the group consisting of a fluorine-containing cyclic carbonate ester, an unsaturated bond-containing cyclic carbonate ester, a fluorine-containing chain carbonate ester, an ester, a cyclic sulfate ester, a cyclic sulfonate ester, an oxalatoborate, an oxalatophosphate, a difluorophosphate, a fluorosulfonate, a bissulfonyl imide salt, a bisphosphoryl imide salt, an aromatic compound, a nitrile compound and an alkylsilane.

The fluorine-containing cyclic carbonate ester is preferably fluoroethylene carbonate, 4,5-difluoroethylene carbonate and the like, the unsaturated bond-containing cyclic carbonate ester is preferably vinylene carbonate, vinylethylene carbonate, ethynylethylene carbonate and the like, the fluorine-containing chain carbonate ester is preferably trifluoroethyl methyl carbonate, ditrifluoroethyl carbonate, ethyltrifluoroethyl carbonate and the like, the ester is preferably methyl acetate, ethyl acetate, methyl propionate, ethyl propionate, methyl trifluoropropionate, ethyl trifluoropropionate and the like, the cyclic sulfate ester is preferably ethylene sulfate, propylene sulfate, butylene sulfate, pentylene sulfate and the like, the cyclic sulfonate ester is preferably 1,3-propenesultone, 1-propene-1,3-sultone, 1,4-butanesultone, methylene methanedisulfonate and the like, the oxalatoborate is preferably $LiBF_2(C_2O_4)$, $LiB(C_2O_4)_2$, $NaBF_2(C_2O_4)$ and the like, the oxalatophosphate is preferably $LiPF_2(C_2O_4)_2$, $LiPF_4(C_2O_4)$, $LiP(C_2O_4)_3$, $NaPF_2(C_2O_4)_2$, $NaPF_4(C_2O_4)$, $NaP(C_2O_4)_3$ and the like, the difluorophosphate is preferably $LiPO_2F_2$, $NaPO_2F_2$ and the like, the fluorosulfonate is preferably $LiSO_3F$, $NaSO_3F$ and the like, the bissulfonyl imide salt is preferably $LiN(FSO_2)_2$, $LiN(CF_3SO_2)_2$, $LiN(CF_3SO_2)(FSO_2)$, $NaN(FSO_2)_2$, $NaN(CF_3SO_2)_2$, $NaN(CF_3SO_2)(FSO_2)$ and the like, the bisphosphoryl imide salt is preferably $LiN(F_2PO)_2$, $NaN(F_2PO)_2$ and the like, the aromatic compound is preferably biphenyl, t-butylbenzene, t-amylbenzene, fluorobenzene, cyclohexylbenzene and the like, the nitrile compound is preferably succinonitrile and the like, and the alkylsilane is preferably ethenyltrimethylsilane, diethenyldimethylsilane, triethenylmethylsilane, tetraethenylsilane, triethenylfluorosilane, diethenylfluoromethylsilane and the like.

The nonaqueous solvent is preferably at least one selected from the group consisting of acyclic carbonate, a chain carbonate, a cyclic ester, a chain ester, a cyclic ether, a chain ether, a sulfone compound, a sulfoxide compound and an ionic liquid.

The present invention is also directed to a method for producing a nonaqueous secondary battery, comprising fabricating a nonaqueous secondary battery comprising a positive electrode, a negative electrode and the above mentioned nonaqueous electrolyte solution via the above method for producing a nonaqueous electrolyte solution.

Effects of the Invention

According to the present invention, a phosphoryl imide salt represented by the general formula (1) can be produced at a satisfactory yield by cation exchange. It is also possible to efficiently produce a nonaqueous electrolyte solution containing the phosphoryl imide salt represented by the general formula (1) through the cation exchange.

MODE FOR CARRYING OUT THE INVENTION

The present invention will be described in detail below. However, the explanations for the constituent requirements described below are merely examples of the embodiments of the present invention, and the scope of the present invention is not limited to these specific embodiments. The present invention may be variously modified and implemented within the whole disclosure of the present application.

[Production of Phosphoryl Imide Salt (1)]

The above-mentioned phosphoryl imide salt in which a sulfonyl group and a phosphoryl group are linked via nitrogen and the above-mentioned phosphoryl imide salt in which two phosphoryl groups are linked via nitrogen are represented by the general formula (1) defined below. The phosphoryl imide salt as a raw material thereof is a compound represented by the general formula (2) defined below, and the both differ in counter cations. Here, A is a phosphoryl imide anion represented by the following general formula.

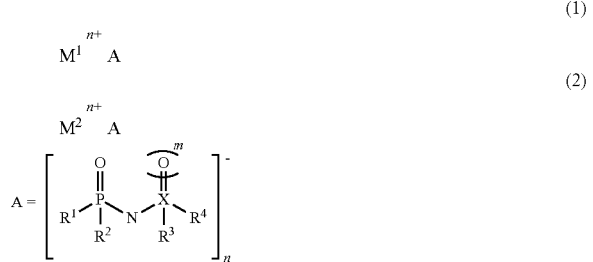

$M^{1\ n+}$ is an alkali metal cation, an alkaline earth metal cation, a quaternary ammonium cation or a quaternary phosphonium cation, $M^{2\ n+}$ is any one of an alkali metal cation, an alkaline earth metal cation, a quaternary ammonium cation and a tertiary ammonium cation (a protonated form of a tertiary organic base), or a mixture thereof, and a cation $M^{1\ n+}$ of the product is different from a cation $M^{2\ n+}$ of the raw material. For example, when $M^{1\ n+}$ a lithium ion, $M^{2\ n+}$ is any one of an alkali metal cation other than the lithium ion, an alkaline earth metal cation, a quaternary ammonium cation and a tertiary ammonium cation (a protonated form of a tertiary organic base), and when $M^{1\ n+}$ is an ethylmethylimidazolium cation (quaternary ammonium), $M^{2\ n+}$ is any one of an alkali metal cation, an alkaline earth metal cation, a quaternary ammonium cation other than the ethylmethylimidazolium cation and a tertiary ammonium cation (a protonated form of a tertiary organic base).

Examples of the alkali metal cation include a lithium ion, a sodium ion, a potassium ion and the like, and examples of the alkaline earth metal cation include a magnesium ion, a calcium ion and the like. Examples of the quaternary ammonium cation include a tetraalkylammonium cation, an imidazolium cation, a pyrazolium cation, a pyridinium cation, a pyrimidinium cation and the like. Examples of the quaternary phosphonium cation include a tetraalkylphosphonium cation and the like.

In the general formulas (1) and (2), N is a nitrogen atom, P is a phosphorus atom, X is a sulfur atom or a phosphorus atom. n is 1 or 2. When X is a sulfur atom, m is 2 and $R^4$ is absent. When X is a phosphorus atom, m is 1.

In the general formulas (1) and (2), $R^1$, $R^2$, $R^3$ and $R^4$ are each independently selected from a fluorine atom, an alkyl group, an alkoxy group, an alkenyl group, an alkenyloxy group, an alkynyloxy group and an aryloxy group.

Examples of the alkyl group include alkyl groups having 1 to 10 carbon atoms and fluorine-containing alkyl groups, such as a methyl group, an ethyl group, an n-propyl group, an isopropyl group, an n-butyl group, an isobutyl group, a secondary butyl group, a tertiary butyl group, a pentyl group (an n-pentyl group, a neopentyl group, an isopentyl group, a secondary pentyl group, a 3-pentyl group, a tert-pentyl group), a trifluoromethyl group, a 2,2-difluoroethyl group, a 2,2,2-trifluoroethyl group, a 2,2,3,3-tetrafluoropropyl group and a 1,1,1,3,3,3-hexafluoroisopropyl group.

Examples of the alkoxy group include alkoxy groups having 1 to 10 carbon atoms and fluorine-containing alkoxy groups, such as a methoxy group, an ethoxy group, an n-propoxy group, an isopropoxy group, an n-butoxy group, an isobutoxy group, a secondary butoxy group, a tertiary butoxy group, a pentyloxy group (an n-pentyloxy group, a neopentyloxy group, an isopentyloxy group, a secondary pentyloxy group, a 3-pentyloxy group, a tert-pentyloxy group), a trifluoromethoxy group, a 2,2-difluoroethoxy group, a 2,2,2-trifluoroethoxy group, a 2,2,3,3-tetrafluoropropoxy group and a 1,1,1,3,3,3-hexafluoroisopropoxy group, cycloalkoxy groups having 3 to 10 carbon atoms such as a cyclopentyloxy group and a cyclohexyloxy group, and fluorine-containing cycloalkoxy groups thereof.

Examples of the alkenyl group include a vinyl group, a 1-propenyl group and a 1-butenyl group, examples of the alkenyloxy group include alkenyloxy groups having 2 to 10 carbon atoms, such as a vinyloxy group, a 1-propenyloxy group, a 2-propenyloxy group, an isopropenyloxy group, a 2-butenyloxy group, a 3-butenyloxy group and a 1,3-butadienyloxy group, and fluorine-containing alkenyloxy groups thereof, and examples of the alkynyloxy group include alkynyloxy groups having 2 to 10 carbon atoms, such as an ethynyloxy group, a 2-propynyloxy group and a 1,1-dimethyl-2-propynyloxy group, and fluorine-containing alkynyloxy groups thereof.

Examples of the aryloxy group include aryloxy groups having 6 to 10 carbon atoms, such as a phenyloxy group, a tolyloxy group and a xylyloxy group, and fluorine-containing aryloxy groups thereof.

Examples of the method for obtaining the phosphoryl imide salt (2) include, but are not particularly limited to:

a method in which a sulfonamide having a fluorine atom, an alkyl group, an alkoxy group, an alkenyl group, an alkenyloxy group, an alkynyloxy group or an aryloxy group is reacted with a phosphoryl halide such as phosphorus oxydifluorochloride in the presence of an organic base, a method in which various sulfamic acid alkyl ester compounds, for example, a sulfamic acid alkyl esters such as a sulfamic acid methyl ester, and those wherein the methyl group thereof is replaced with an alkenyl group, an alkynyl group or an aryl group, are reacted with a phosphoryl halide such as phosphorus oxydifluorochloride in the presence of an organic base, a method in which sulfamic acid fluoride is reacted with a phosphoryl halide such as phosphorus oxydifluorochloride in the presence of an organic base, a method in which a sulfonamide having a fluorine atom, an alkyl group, an alkoxy group, an alkenyl group, an alkenyloxy group, an alkynyloxy group or an aryloxy group is reacted with a phosphoryl halide such as dimethyl chlorophosphate in the presence of an organic base, a method in which various sulfamic acid ester compounds, for example, sulfamic acid alkyl esters such as sulfamic acid methyl ester and those wherein the methyl group thereof is replaced with an alkenyl group, an alkynyl group or an aryl group, are reacted with a phosphoryl halide such as dimethyl chlorophosphate in the presence of an organic base, a method in which a sulfamic acid fluoride is reacted with a phosphoryl halide such as dimethyl chlorophosphate in the presence of an organic base, a method in which a phosphoric acid amide having a fluorine atom, an alkyl group, an alkoxy group, an alkenyl group, an alkenyloxy group, an alkynyloxy group or an aryloxy group is reacted with a phosphoryl halide such as dimethyl chlorophosphate in the presence of an organic base, and a method in which a silazane compound such as hexamethyldisilazane is reacted with a phosphoryl halide such as phosphorus oxydifluorochloride in the presence of an organic base and the like.

Examples of the method of obtaining the phosphoryl imide salt (2) include:

a method in which a phosphoric acid amide having a group selected from a fluorine atom, an alkyl group, an alkoxy group, an alkenyl group, an alkenyloxy group, an alkynyloxy group and an aryloxy group is reacted with a sulfonyl halide having a fluorine atom, an alkyl group, an alkoxy group, an alkenyl group, an alkenyloxy group, an alkynyloxy group or an aryloxy group in the presence of an organic base.

From the viewpoint of the selectivity in the production of a phosphoryl imide salt (2), the method preferably comprises the step of:

mixing with an organic base, a mixture which has been previously prepared by mixing the phosphoric acid amide with the sulfonyl halide, or mixing with the phosphoric acid amide, a mixture which has been previously prepared by mixing the sulfonyl halide with the organic base.

In this connection, various synthesis methods are disclosed concerning a bissulfonyl imide salt (its counter cation is an alkali metal) which is not the above-mentioned phosphoryl imide salt but has a similar structure, and typical examples thereof are shown below.

Examples 1 to 3 of Patent Document 5 disclose that a bis(fluorosulfonyl)imide ammonium salt is dissolved in butyl acetate, and an aqueous potassium hydroxide solution, an aqueous lithium hydroxide solution or an aqueous sodium hydroxide solution is added thereto and then the resulting mixture is heated to reflux under reduced pressure, thus making it possible to exchange the counter cation of the imide salt to potassium, lithium or sodium from ammonium.

Synthesis Example 9 of Patent Document 6 not only discloses that a bis(fluorosulfonyl)imide triethylammonium salt is dissolved in butyl acetate and an aqueous lithium hydroxide solution is added thereto and then the aqueous phase is removed, and thus high-purity lithium bis(fluorosulfonyl)imide is included in the remaining organic phase, but also suggests in paragraph [0069] that a treatment of a bis(fluorosulfonyl)imide salt (its counter cation is an onium) dissolved in water with a cation exchange resin makes it possible to exchange it into a bis(fluorosulfonyl)imide salt (its counter cation is an alkali metal).

Example 1 of Patent Document 7 discloses a technique in which cation exchange is performed by treating a bis(fluorosulfonyl)imide triethylammonium salt with an aqueous potassium hydroxide solution, and then water and triethylamine liberated are distilled off and crystals are precipitated in isopropanol to produce high-purity potassium bis(fluorosulfonyl)imide.

As mentioned above, with regard to a bissulfonyl imide salt, it is common to carry out cation exchange in a solvent system containing water in order to exchange the counter cation to an alkali metal. Using this technique, an attempt was made to convert a phosphoryl imide salt (2) into a phosphoryl imide salt (1). As a result, the yield varied widely and was about 20% at most.

The results of examination of the cause of yield decrease and large variation revealed that the phosphoryl imide salt (2) and the phosphoryl imide salt (1) react slowly with a large excess of water, but react quickly with a small excess of water.

For example, when a solution of the phosphoryl imide salt (2) which is the raw material is added to a large excess of water (an aqueous solution containing a hydroxide of an alkali metal) to give an aqueous solution in which the concentration of the phosphoryl imide salt (2) reaches about 1% by mass (1% by mass or less) (reaction with a large excess of water), the yield was about 5 to 20%, and when using a technique in which an aqueous solution containing a hydroxide of an alkali metal is added to a solution of the phosphoryl imide salt (2) to give an aqueous solution in which the concentration of the phosphoryl imide salt (2) reaches about 20% by mass (reaction with a small excess of water), the yield was about 1 to 5%.

When a solution of the phosphoryl imide salt (2) which is the raw material is added to a large excess of water (an aqueous solution containing a hydroxide of an alkali metal), the hydrolysis rate is not high. Although a main component is a solution of an organic solvent and a phosphoryl imide salt (1) in an extraction treatment after cation exchange, there is nothing for it but to temporarily pass a state containing a considerable amount of water. Since this state is close to the condition of the above-mentioned reaction with a small excess of water, it is possible to presume that the hydrolysis proceeds at this stage, leading to the yield of 20% at most.

It is considered that the phenomenon of "the hydrolysis proceeds slowly in the presence of a large excess of water, but proceed quickly in the presence of a small excess of water" is largely influenced by the dissociation state of the counter cation. In other words, the hydrolysis rate is low in a state where the phosphoryl imide anion and the counter cation are dissociated, whereas, the hydrolysis is accelerated by the effect like a Lewis acid exerted by the counter cation in a state where the phosphoryl imide anion and the counter cation are not sufficiently dissociated.

As mentioned above, the yield was extremely low in the technique using an aqueous solution. Therefore, an attempt was made to establish an ion exchange method in a system without using an aqueous solution and, as a result, it has been found that the objective phosphoryl imide salt (1) can be obtained at a high yield of 70% or more by using a cation exchange resin having the objective cation as a counter cation or using a hydrochloride, a carbonate, a sulfate and a sulfonate having the objective cation as cation source in an organic solvent whose water content is reduced to 0.3% by mass or less. When the water content exceeds 0.3% by mass, the yield may decrease as mentioned above.

The upper limit of the water content of the solvent to be used during the ion exchange reaction is preferably 0.05% by mass or less from the viewpoint of the ion exchange yield. From the viewpoint of ion exchange yield, the lower limit of the water content is preferably 0.0001% by mass or more, and more preferably 0.0002% by mass or more.

Particularly, when $M^1{}^{n+}$ is a lithium ion, the water content of the organic solvent is most preferably 0.0001 to 0.03% by mass from the viewpoint of the ion exchange yield.

When $M^1{}^{n+}$ is a sodium ion, the water content of the organic solvent is most preferably 0.001 to 0.05% by mass from the viewpoint of the ion exchange yield.

The solvent to be used during the ion exchange reaction is not particularly limited as long as the water content is within the above range. It is possible to use, for example, carbonate esters, chain esters, ketones, lactones, ethers, nitriles, amides, sulfones and the like, and these solvents may be used alone, or a mixed solvent of two or more thereof may also be used.

Specific examples of the solvent include dimethyl carbonate, ethyl methyl carbonate, diethyl carbonate, methyl propyl carbonate, ethyl propyl carbonate, methyl acetate, ethyl acetate, propyl acetate, butyl acetate, methyl propionate, ethyl propionate, butyl propionate, acetone, ethyl methyl ketone, diethyl ketone, γ-butyrolactone, γ-valerolactone, tetrahydrofuran, tetrahydropyran, dibutyl ether, diisopropyl ether, 1,2-dimethoxyethane, diethylene glycol dimethyl ether, diethylene glycol diethyl ether, triethylene glycol dimethyl ether, tetraethylene glycol dimethyl ether, 1,2-diethoxyethane, acetonitrile, propionitrile, N,N-dimethylformamide, dimethyl sulfoxide, sulfolane and the like. Of these, a solvent having a boiling point of 130° C. or lower is preferable, and dimethyl carbonate, ethyl methyl carbonate, diethyl carbonate, methyl acetate, ethyl acetate, methyl propionate, ethyl propionate, acetone, ethyl methyl ketone, tetrahydrofuran, 1,2-dimethoxyethane and the like are more preferable.

The temperature of the cation exchange reaction of the phosphoryl imide salt (2) is −40 to 130° C., and preferably −20 to 100° C. The cation exchange reaction does not proceed sufficiently at the temperatures lower than −40° C., and the decomposition of the phosphoryl imide salt (1) may occur at the temperatures higher than 130° C. In order to prevent the distillation of the solvent while obtaining a sufficient reaction rate, the temperature in a range of −10 to 70° C. is optimum.

The reaction time can be appropriately selected according to the reaction rate and, actually, the reaction time is preferably within 72 hours since occupation of an apparatus for a long time leads to an increase in production cost. In order to allow the reaction of the whole system to proceed, the solution is preferably stirred during the reaction.

The amount of the cation exchange resin to be used for the cation exchange is not particularly limited, and the treatment time can be preferably shortened as the amount becomes larger in relation to the phosphoryl imide salt (2) which is the raw material, but the cost also increases. Therefore, for example, the amount is preferably 1.0 to 20.0 equivalents, and more preferably 1.1 to 5.0 equivalents, based on the phosphoryl imide salt (2) as the raw material.

The amount of the metal salt (4) to be used for the cation exchange is not particularly limited, and the treatment time can be shortened as the amount becomes larger in relation to the phosphoryl imide salt (2) which is the raw material, but the cost also increases. Therefore, for example, the amount is preferably 1.0 to 5.0 equivalents, and more preferably 1.1 to 3.0 equivalents, based on the phosphoryl imide salt (2) as the raw material.

As mentioned above, the method for performing cation exchange by bringing a phosphoryl imide salt (2) into contact with an equivalent or more of a cation exchange resin having $M^{1\ n+}$ or a metal salt represented by the general formula (4) in an organic solvent having a water content of 0.3% by mass or less includes, for example:

a method in which a phosphoryl imide salt (2) is mixed with an equivalent or more of a cation exchange resin having $M^{1\ n+}$ or metal salt represented by the general formula (4) in an organic solvent having a water content of 0.3% by mass or less. The mixing time can be appropriately selected according to the cation exchange reaction rate and, actually, the mixing time is preferably within 72 hours since occupation of an apparatus for a long time leads to an increase in production cost. In order to allow the reaction of the whole system to proceed, the solution is preferably stirred during the reaction. Stirring is generally performed by a stirring blade, and the rotational speed can be appropriately adjusted according to the viscosity of the reaction solution. Since the stirring effect is hardly obtained if the rotational speed is less than appropriately adjusted rotational speed, the rotation speed is preferably 40 rpm or more. In order to prevent excessive load from applying on the stirrer, the rotation speed is preferably 4,000 rpm or less.

It is also possible to perform cation exchange, for example, by passing a solution which is prepared by dissolving the phosphoryl imide salt (2) in an organic solvent having a water content of 0.3% by mass or less, through a flow path filled with the cation exchange resin or the metal salt represented by the general formula (4), thereby bringing the solution into contact with the cation exchange resin or the metal salt.

[Production of Nonaqueous Electrolyte Solution Containing Phosphoryl Imide Salt (1)]

The nonaqueous electrolyte of the present invention is obtained by dissolving at least a phosphoryl imide salt produced by the method for producing phosphoryl imide salt and a solute in a nonaqueous solvent.

1. Phosphoryl Imide Salt (1)

At least one of $R^1$ to $R^4$ is preferably a fluorine atom. Although the reason is not known exactly, when at least one is a fluorine atom, the internal resistance of a nonaqueous secondary battery using the electrolyte solution tends to be suppressed.

More specifically, examples of the phosphoryl imide anion represented by A in the present invention include the following compounds a to w. However, the phosphoryl imide salt used in the present invention is not limited in no way by the following examples.

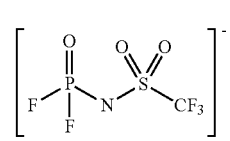

a

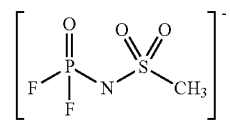

b

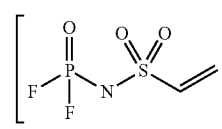

c

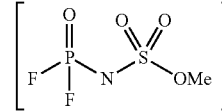

d

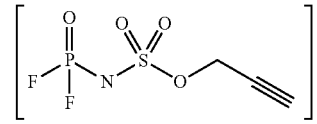

e

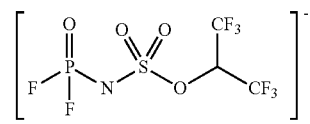

f

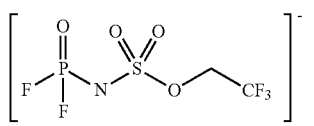
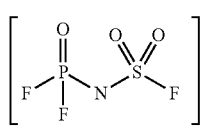
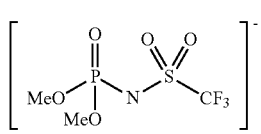
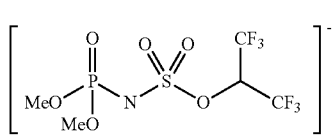
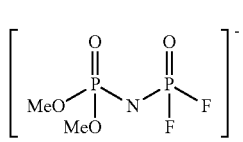
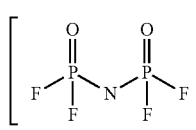
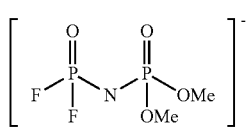
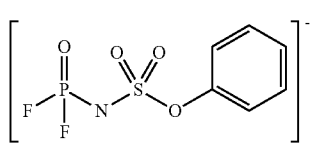
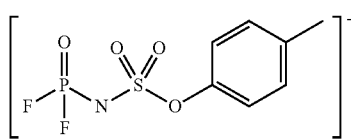
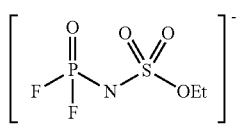
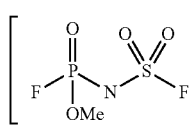

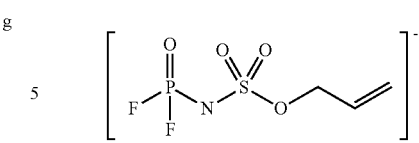
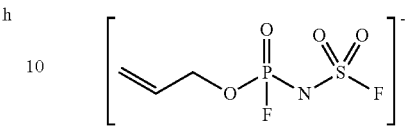
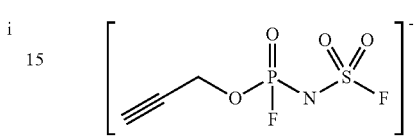
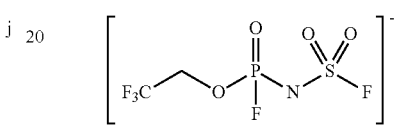
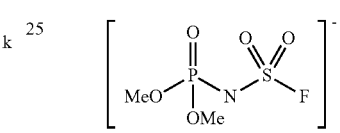
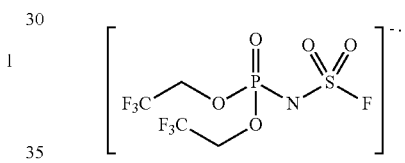

The phosphoryl imide salt represented by the general formula (1) in the present invention is preferably a compound in which at least one of $R^1$ to $R^4$ is a fluorine atom, or at least one of $R^1$ to $R^4$ is selected from a hydrocarbon group having 6 or less carbon atoms which may contain a fluorine atom.

In case the number of carbon atoms of the hydrocarbon group is more than 6, the internal resistance tends to be comparatively large when a film is formed on an electrode. In case the number of carbon atoms of the hydrocarbon group is 6 or less, the internal resistance tends to be smaller. The hydrocarbon group is particularly preferably at least one group selected from a methyl group, an ethyl group, a propyl group, a vinyl group, an allyl group, an ethynyl group, a 2-propinyl group, a phenyl group, a trifluoromethyl group, a 2,2-difluoroethyl group, a 2,2,2-trifluoroethyl group, a 2,2,3,3-tetrafluoropropyl group, a 1,1,1,3,3,3-hexafluoroisopropyl group, and an alkoxy group, an alkenyloxy group and an alkynyloxy group derived from these groups since it is possible to obtain a nonaqueous secondary battery capable of exhibiting cycle characteristics and internal resistance characteristics in a well-balanced manner.

The phosphoryl imide salt represented by the general formula (1) preferably has high purity, and particularly, the content of Cl (chlorine) in the phosphoryl imide salt is preferably 5,000 ppm by mass or less, more preferably 1,000 ppm by mass or less, and still more preferably 100 ppm by mass or less, as the raw material before dissolving it in the electrolyte solution. It is not preferable to use a phosphoryl imide salt in which high concentration of Cl (chlorine) remains since the phosphoryl imide salt tends to corrode battery members.

Suitable lower limit of the addition amount of the phosphoryl imide salt represented by the general formula (1) is 0.005% by mass or more, preferably 0.05% by mass or more, and more preferably 0.1% by mass or more, based on the total amount of the nonaqueous solvent mentioned below, the solute mentioned below and the phosphoryl imide salt represented by the general formula (1), and suitable upper limit is 12.0% by mass or less, preferably 6.0% by mass or less, and more preferably 3.0% by mass or less.

If the addition amount is less than 0.005% by mass, it is not preferable since the effect of improving battery characteristics is sufficiently obtained. Meanwhile, if the addition amount exceeds 12.0% by mass, it is not preferable since not only no additional effect is obtained, which is meaningless, but also the resistance increases due to excessive film formation to easily cause deterioration of battery performances. These phosphoryl imide salts (1) may be used alone, or two or more thereof may be used by mixing them with any combination and ratio according to applications, as long as the amount does not exceed 12.0% by mass.

2. Solute

The kind of the solute to be used in the nonaqueous electrolyte solution of the present invention is not particularly limited, and any electrolyte salt can be used. In the case of a lithium battery and a lithium ion battery, specific examples of the solute include electrolyte salts typified by $LiPF_6$, $LiBF_4$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiClO_4$, $LiAsF_6$, $LiSbF_6$, $LiCF_3SO_3$, $LiSO_3F$, $LiN(C_2F_5SO_2)_2$, $LiN(CF_3SO_2)(FSO_2)$, $LiC(CF_3SO_2)_3$, $LiPF_3(C_3F_7)_3$, $LiB(CF_3)_4$, $LiBF_3(C_2F_5)$ and the like. In the case of a sodium ion battery, specific examples of the solute include electrolyte salts typified by $NaPF_6$, $NaBF_4$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaN(CF_3SO_2)_2$, $NaClO_4$, $NaAsF_6$, $NaSbF_6$, $NaCF_3SO_3$, $NaSO_3F$, $NaN(C_2F_5SO_2)_2$, $NaN(CF_3SO_2)(FSO_2)$, $NaC(CF_3SO_2)_3$, $NaPF_3(C_3F_7)_3$, $NaB(CF_3)_4$, $NaBF_3(C_2F_5)$ and the like. These solutes may be used alone, or two or more thereof may be used by mixing them with any combination and ratio according to applications. Of these, in view of energy density, output characteristics, lifetime and the like as the battery, the solute is preferably $LiPF_6$, $LiBF_4$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$, $LiSO_3F$, $NaPF_6$, $NaBF_4$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaN(CF_3SO_2)_2$, $NaSO_3F$ and $NaN(CF_3SO_2)(FSO_2)$.

As suitable combinations of solutes, for example, combinations of at least one selected from the group consisting of $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$ and $LiSO_3F$, with $LiPF_6$ and the like are preferable.

When using, as the solute, at least one selected from the group consisting of $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$ and $LiSO_3F$ in combination with $LiPF_6$, a ratio (molar ratio based on 1 mol of $LiPF_6$) is preferably 1:0.001 to 1:0.5, and more preferably 1:0.01 to 1:0.2. Use of the solutes in combination at the ratio mentioned above has the effect of further improving various battery characteristics. Meanwhile, when the ratio of $LiPF_6$ is less than 1:0.5, the ionic conductivity of the electrolyte solution tends to decrease, leading to an increase in resistance.

The concentration of these solutes is not particularly limited, and suitable lower limit is 0.5 mol/L or more, preferably 0.7 mol/L or more, and more preferably 0.9 mol/L or more, and suitable upper limit is preferably in a range of 2.5 mol/L or less, preferably 2.0 mol/L or less, and more preferably 1.5 mol/L or less. If the concentration is less than 0.5 mol/L, the ionic conductivity tends to deteriorate, leading to deterioration of cycle characteristics and output characteristics of the nonaqueous secondary battery. Meanwhile, if the concentration exceeds 2.5 mol/L, the viscosity of the nonaqueous electrolyte increases, so that the ionic conductivity also tends to deteriorate, leading to deterioration of cycle characteristics and output characteristics of the nonaqueous secondary battery.

Dissolving a large amount of the solute in a nonaqueous solvent at one time may increase the temperature of the nonaqueous electrolyte due to the heat of dissolution of the solute. If the liquid temperature rises significantly, decomposition of an electrolyte salt containing a fluorine atom may be promoted to generate hydrogen fluoride. Hydrogen fluoride is not preferable because it causes deterioration of the battery performances. Therefore, while the liquid temperature at which the solute is dissolved in the nonaqueous solvent is not particularly limited, it is preferably $-20$ to $80°$ C., and more preferably 0 to $60°$ C.

3. Nonaqueous Solvent

The kind of the nonaqueous solvent to be used for the nonaqueous electrolyte solution of the present invention is not particularly limited, and any nonaqueous solvent can be used. Specific examples thereof include cyclic carbonates such as propylene carbonate (hereinafter sometimes referred to as "PC"), ethylene carbonate (hereinafter sometimes referred to as "EC") and butylene carbonate; chain carbonates such as diethyl carbonate (hereinafter sometimes referred to as "DEC"), dimethyl carbonate (hereinafter sometimes referred to as "DMC") and ethyl methyl carbonate (hereinafter sometimes referred to as "EMC"); cyclic esters such as γ-butyrolactone and γ-valerolactone; chain esters such as methyl acetate, methyl propionate and ethyl propionate (hereinafter sometimes referred to as "EP"); cyclic ethers such as tetrahydrofuran, 2-methyltetrahydrofuran and dioxane; chain ethers such as dimethoxyethane and diethyl ether; and sulfone and sulfoxide compounds, such as dimethyl sulfoxide and sulfolane. Although a category differs from the nonaqueous solvent, an ionic liquid, etc. can also be exemplified. The nonaqueous solvent to be used in the present invention may be used alone, or two or more thereof may be used by mixing them with any combination and ratio according to applications. Of these, propylene carbonate, ethylene carbonate, diethyl carbonate, dimethyl carbonate, ethyl methyl carbonate, methyl propionate, ethyl propionate and the like are particularly preferable from the viewpoint of electrochemical stability against oxidation/reduction and heat and chemical stability involved in the reaction with the above-mentioned solute.

For example, it is preferable to contain, as the nonaqueous solvent, one or more cyclic carbonates having a high dielectric constant and one or more chain carbonates or chain esters having a low liquid viscosity, since the ionic conductivity of the resultant electrolyte solution increases. Specifically, it is more preferable to use the following combinations:

(1) combination of EC and EMC,
(2) combination of EC and DEC,
(3) combination of EC, DMC and EMC,
(4) combination of EC, DEC and EMC,
(5) combination of EC, EMC and EP, (6) combination of PC and DEC,
(7) combination of PC and EMC,
(8) combination of PC and EP,
(9) combination of PC, DMC and EMC,
(10) combination of PC, DEC and EMC,
(11) combination of PC, DEC and EP,
(12) combination of PC, EC and EMC,
(13) combination of PC, EC, DMC and EMC,
(14) combination of PC, EC, DEC and EMC, and
(15) combination of PC, EC, EMC and EP.

4. Additives

While the basic constitution of the nonaqueous electrolyte solution of the present invention has been described, commonly used additives may be used in the nonaqueous electrolyte solution of the present invention in any ratio, as long as the gist of the present invention is not impaired.

Specific examples thereof include compounds having overcharge prevention effect, negative electrode film formation effect and positive electrode protection effect, such as a fluorine-containing cyclic carbonate ester, an unsaturated bond-containing cyclic carbonate ester, a fluorine-containing chain carbonate ester, an ester, a cyclic sulfate ester, a cyclic sulfonate ester, an oxalatoborate, an oxalatophosphate, a difluorophosphate, a fluorosulfonate, a bissulfonyl imide salt, a bisphosphoryl imide salt, an aromatic compound, a nitrile compound and an alkylsilane.

Of these, the fluorine-containing cyclic carbonate ester is preferably fluoroethylene carbonate (hereinafter sometimes referred to as "FEC"), 4,5-difluoroethylene carbonate or the like; the unsaturated bond-containing cyclic carbonate ester is preferably vinylene carbonate (hereinafter sometimes referred to as "VC"), vinylethylene carbonate, ethynylethylene carbonate or the like; the cyclic sulfate ester is preferably ethylene sulfate, propylene sulfate, butylene sulfate, pentylene sulfate or the like; the cyclic sulfonate ester is preferably 1,3-propenesultone, 1-propene-1,3-sultone, 1,4-butanesultone, methylene methanedisulfonate or the like; the oxalatoborate is preferably $LiBF_2(C_2O_4)$, $LiB(C_2O_4)_2$, $NaBF_2(C_2O_4)$ or the like; the oxalatophosphate is preferably $LiPF_2(C_2O_4)_2$, $LiPF_4(C_2O_4)$, $LiP(C_2O_4)_3$, $NaPF_2(C_2O_4)_2$, $NaPF_4(C_2O_4)$, $NaP(C_2O_4)_3$ or the like; the bissulfonyl imide salt is preferably $LiN(FSO_2)_2$, $LiN(CF_3SO_2)_2$, $LiN(CF_3SO_2)(FSO_2)$, $NaN(FSO_2)_2$, $NaN(CF_3SO_2)_2$, $NaN(CF_3SO_2)(FSO_2)$ or the like; the aromatic compound is preferably biphenyl, t-butylbenzene, t-amylbenzene, fluorobenzene, cyclohexylbenzene or the like; the nitrile compound is preferably succinonitrile or the like; and the alkylsilane is preferably ethenyltrimethylsilane, diethenyldimethylsilane, triethenylmethylsilane, tetraethenylsilane, triethenylfluorosilane, diethenylfluoromethylsilane or the like.

Although some of the above-mentioned additives overlap with the above-mentioned solutes, these compounds can be used in relatively large amounts (for example, 0.5 to 2.5 mol/L) like the solute, while, like the additive, these compounds can also be used in relatively small amounts (for example, 0.005 to 5.0% by mass based on the total amount of the electrolyte solution).

It is also possible to use alkali metal salts other than the solute (lithium salt, sodium salt) and the phosphoryl imide salt (1) (lithium salt, sodium salt) as the additive. Specific examples thereof include carboxylates such as lithium acrylate, sodium acrylate, lithium methacrylate and sodium methacrylate; and sulfate esters such as lithium methyl sulfate, sodium methyl sulfate, lithium ethyl sulfate and sodium methyl sulfate.

It is also possible to use a nonaqueous electrolyte solution after being pseudo-solidified with a gelling agent or a crosslinked polymer, like a lithium polymer battery.

In the nonaqueous electrolyte solution of the present invention, according to the required characteristics, a plurality of kinds of the above-mentioned solutes (lithium salt, sodium salt) or the above-mentioned phosphoryl imide salt (1) (lithium salt, sodium salt) may be used in combination, i.e., a total of four kinds of the alkali metal salts.

For example, when four kinds of lithium salts are contained, one kind is used from solutes such as lithium hexafluorophosphate and lithium tetrafluoroborate (hereinafter sometimes referred to as "first solute"), one kind is used from solutes such as $LiPF_4(C_2O_4)$, $LiPF_2(C_2O_4)_2$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiClO_4$, $LiAsF_6$, $LiSbF_6$, $LiCF_3SO_3$, $LiSO_3F$, $LiN(C_2F_5SO_2)_2$, $LiN(CF_3SO_2)(FSO_2)$, $LiC(CF_3SO_2)_3$, $LiPF_3(C_3F_7)_3$, $LiB(CF_3)_4$ and $LiBF_3(C_2F_5)$ (hereinafter sometimes referred to as "second solute") and two kinds are used from lithium salts such as the above compounds a to w as the phosphoryl imide salt (1).

It can be recognized that one kind is used from the first solute, two kinds are used from the second solutes, and one kind is used from the phosphoryl imide salt (1).

Specifically, it is preferable to use four kinds of lithium salts as follows:
(1) combination of $LiPF_6$, a lithium salt of the compound a, a lithium salt of the compound c and $LiPF_2(C_2O_4)_2$,
(2) combination of $LiPF_6$, a lithium salt of the compound a, a lithium salt of the compound d and $LiPO_2F_2$,
(3) combination of $LiPF_6$, a lithium salt of the compound a, $LiPO_2F_2$ and $LiN(F_2PO)_2$,
(4) combination of $LiPF_6$, a lithium salt of the compound c, $LiPF_2(C_2O_4)_2$ and $LiPO_2F_2$, since higher effect of suppressing an increase in internal resistance at low temperature is exhibited.

If necessary, additives other than those additives mentioned above may be further used in combination.

Furthermore, a total of five kinds of the above-mentioned alkali metal salts may be used. For example, when five kinds of lithium salts are used, one kind is used from the first solute, one kind is used from the second solute, and three kinds are used from lithium salts such as the compounds a to w.

Alternatively, one kind is used from the first solutes, two kinds are used from the second solutes, and two kinds are used from the lithium salts of the compounds a to w.

Alternatively, one kind is used from the first solute, three kinds are used from the second solutes, and one kind is used from the lithium salts such as compounds a to w.

Specifically, it is preferable to use five kinds of lithium salts as follows:
(1) combination of $LiPF_6$, a lithium salt of the compound a, a lithium salt of the compound c, $LiPF_4(C_2O_4)$ and $LiPF_2(C_2O_4)_2$,
(2) combination of $LiPF_6$, a lithium salt of the compound a, a lithium salt of the compound d, $LiB(C_2O_4)_2$ and $LiPO_2F_2$,
(3) combination of $LiPF_6$, a lithium salt of the compound a, $LiB(C_2O_4)_2$, $LiPO_2F_2$ and $LiSO_3F$,
(4) combination of $LiPF_6$, a lithium salt of the compound c, $LiB(C_2O_4)_2$, $LiPO_2F_2$ and $LiSO_3F$,
(5) combination of $LiPF_6$, a lithium salt of the compound h, $LiB(C_2O_4)_2$, $LiPO_2F_2$ and $LiSO_3F$,
(6) combination of $LiPF_6$, a lithium salt of the compound c, $LiPF_4(C_2O_4)$, $LiPF_2(C_2O_4)_2$ and $LiPO_2F_2$,
(7) combination of $LiPF_6$, a lithium salt of the compound c, $LiBF_2(C_2O_4)$, $LiPO_2F_2$ and $LiSO_3F$, and (8) combination of LiPF$_6$, a lithium salt of the compound e, a lithium salt of the compound f, LiB(C$_2$O$_4$)$_2$ and LiPO$_2$F$_2$, since higher effect of suppressing gas generation at high temperature is exhibited.

If necessary, lithium salts other than those lithium salts (the above-mentioned additives) may be further used in combination.

[Production of Nonaqueous Secondary Battery]

The configuration of a nonaqueous secondary battery of the present invention will be described below. In the nonaqueous secondary battery of the present invention, the above-mentioned nonaqueous electrolyte solution of the present invention is used. The other components to be used are those used in common nonaqueous secondary batteries, namely, a positive electrode and a negative electrode capable of absorbing and releasing lithium, a current collector, a separator, a container and the like.

The negative electrode material is not particularly limited. In the case of a lithium battery and a lithium ion battery, it is possible to use lithium metal, alloys or intermetallic compounds of lithium metal and other metals, various carbon materials (artificial graphite, natural graphite, etc.), metal oxides, metal nitrides, tin (simple substance), tin compounds, silicon (simple substance), silicon compounds, activated carbon, conductive polymers and the like.

Examples of the carbon material include graphitizable carbon, non-graphitizable carbon (hard carbon) having a spacing of 0.37 nm or more of the (002) plane, graphite having a spacing of 0.34 nm or less of the (002) plane and the like. More specific examples thereof include pyrolytic carbon, cokes, glassy carbon fibers, organic polymer compound fired bodies, activated carbon, carbon blacks and the like. Of these, cokes include pitch coke, needle coke, petroleum coke and the like. The organic polymer compound fired body refers to a product obtained by firing and carbonizing a phenol resin, a furan resin or the like at an appropriate temperature. The carbon material is preferable because a crystal structure accompanying occlusion and release of lithium scarcely changes, thus making it possible to obtain high energy density and excellent cycle characteristics. The shape of the carbon material may be any form such as fibrous, spherical, granular or scaly form. Amorphous carbon or a graphite material coated with amorphous carbon on the surface is more preferable since the reactivity between the material surface and the electrolyte solution decreases.

The positive electrode material is not particularly limited. In the case of a lithium battery and a lithium ion battery, for example, it is possible to use lithium containing transition metal composite oxides such as LiCoO$_2$, LiNiO$_2$, LiMnO$_2$ and LiMn$_2$O$_4$ those in which a plurality of transition metals such as Co, Mn and Ni of their lithium containing transition metal composite oxides are mixed, those in which a part of transition metals of the lithium-containing transition metal composite oxides is substituted with the metals other than the transition metals, LiFePO$_4$ called olivine, phosphoric acid compounds of transition metals, such as LiCoPO$_4$ and LiMnPO$_4$, oxides such as TiO$_2$, V$_2$O$_3$ and MoO$_3$, sulfides such as TiS$_2$ and FeS, conductive polymers such as polyacetylene, polyparaphenylene, polyaniline and polypyrrole, activated carbon, polymers capable of generating radicals, carbon materials and the like.

To positive and negative electrode materials, conductive materials such as acetylene black, ketjen black, carbon fibers and graphite, and binders such as polytetrafluoroethylene, polyvinylidene fluoride, SBR resin and polyimide and the like are added, followed by molded into a sheet shape, and thus an electrode sheet can be obtained.

It is possible to use, as the separator for preventing contact between the positive electrode and the negative electrode, a nonwoven fabric, a porous sheet or the like made of polypropylene, polyethylene, paper, glass fibers and the like.

From the above respective elements, a nonaqueous secondary battery having a coin shape, a cylindrical shape, a square shape, an aluminum laminate sheet shape or the like can be assembled.

The nonaqueous secondary battery may be the following nonaqueous secondary battery comprising (i) the above-mentioned nonaqueous electrolyte solution, (ii) a positive electrode, (iii) a negative electrode and (iv) a separator.

[(ii) Positive Electrode]

(ii) The positive electrode preferably contains at least one oxide and/or polyanion compound as a positive electrode active material.

[Positive Electrode Active Material]

In the case of a lithium ion secondary battery in which the cation in the nonaqueous electrolyte solution is mainly composed of lithium, the positive electrode active material constituting (ii) the positive electrode is not particularly limited as long as it is a material capable of charging and discharging, and examples thereof include at least one from (A) a lithium transition metal composite oxide containing at least one metal of nickel, manganese and cobalt and having a layered structure, (B) a lithium manganese composite oxide having a spinel structure, (C) a lithium-containing olivine-type phosphate and (D) a lithium-excess layered transition metal oxide having a layered rock salt-type structure.

((A) Lithium Transition Metal Composite Oxide)

Positive Electrode Active Material (A): Examples of a lithium transition metal composite oxide containing at least one metal of nickel, manganese and cobalt and having a layered structure include lithium-cobalt composite oxide, lithium-nickel composite oxide, lithium-nickel-cobalt composite oxide, lithium-nickel-cobalt-aluminum composite oxide, lithium-cobalt-manganese composite oxide, lithium-nickel-manganese composite oxide, lithium-nickel-manganese-cobalt composite oxide and the like. It is possible to use those in which transition metal atoms, which are main components of these lithium transition metal composite oxides, may be partially substituted with other elements such as Al, Ti, V, Cr, Fe, Cu, Zn, Mg, Ga, Zr, Si, B, Ba, Y and Sn.

Specific examples of the lithium-cobalt composite oxide and the lithium-nickel composite oxide include LiCoO$_2$, LiNiO$_2$, lithium cobaltate containing different elements such as Mg, Zr, Al and Ti added thereto (LiCo$_{0.98}$Mg$_{0.01}$Zr$_{0.01}$O$_2$, LiCo$_{0.98}$Mg$_{0.01}$Al$_{0.01}$O$_2$, LiCo$_{0.97}$Mg$_{0.01}$Zr$_{0.005}$Al$_{0.01}$O$_2$, etc.), lithium cobaltate having a rare earth compound immobilized to the surface described in WO 2014/034043 may be used. It is also possible to use those in which the particle surface of LiCoO$_2$ particle powders is partially coated with aluminum oxide, as mentioned in JP 2002-151077 A.

The lithium-nickel-cobalt composite oxide and the lithium-nickel-cobalt-aluminum composite oxide are represented by the following general formula (1-1).

$$Li_aNi_{1-b-c}Co_bM^1_cO_2 \qquad (1\text{-}1)$$

In the formula (1-1), M$^1$ is at least one element selected from the group consisting of Al, Fe, Mg, Zr, Ti and B, a satisfies 0.9≤a≤1.2, and b and c satisfy the conditions of 0.1≤b≤0.3 and 0≤c≤0.1.

These composite oxides can be prepared, for example, according to the production method mentioned in JP 2009-137834 A. Specific examples thereof include LiNi$_{0.8}$Co$_{0.2}$O$_2$, LiNi$_{0.85}$Co$_{0.10}$Al$_{0.05}$O$_2$, LiNi$_{0.87}$Co$_{0.10}$Al$_{0.03}$O$_2$, LiNi$_{0.6}$Co$_{0.3}$Al$_{0.1}$O$_2$ and the like.

Specific examples of the lithium-cobalt-manganese composite oxide and the lithium-nickel-manganese composite oxide include LiNi$_{0.5}$Mn$_{0.5}$O$_2$, LiCo$_{0.5}$Mn$_{0.5}$O$_2$ and the like.

Examples of the lithium-nickel-manganese-cobalt composite oxide include lithium-containing composite oxide represented by the following general formula (1-2).

$$Li_dNi_eMn_fCo_gM^2_hO_2 \qquad (1\text{-}2)$$

In the formula (1-2), $M^2$ is at least one element selected from the group consisting of Al, Fe, Mg, Zr, Ti, B and Sn, d satisfies $0.9 \le d \le 1.2$, and e, f, g and h satisfy the conditions of $e+f+g+h=1$, $0 \le e \le 0.7$, $0 \le f \le 0.5$, $0 \le g \le 0.5$, and $h \ge 0$.

The lithium-nickel-manganese-cobalt composite oxide is preferably lithium-nickel-manganese-cobalt composite oxide containing manganese in the range represented by the general formula (1-2) in order to enhance the structural stability and to improve the safety at high temperature in a lithium secondary battery, and more preferably lithium-nickel-manganese-cobalt composite oxide further containing cobalt in the range represented by the general formula (1-2) in order to enhance high efficiency characteristics of a lithium ion secondary battery.

Specific examples thereof include Li[Ni$_{1/3}$Mn$_{1/3}$Co$_{1/3}$]O$_2$, Li[Ni$_{0.45}$Mn$_{0.35}$Co$_{0.2}$]O$_2$, Li[Ni$_{0.5}$Mn$_{0.3}$Co$_{0.2}$]O$_2$, Li[Ni$_{0.6}$Mn$_{0.2}$Co$_{0.2}$]O$_2$, Li[Ni$_{0.49}$Mn$_{0.3}$Co$_{0.2}$Zr$_{0.01}$]O$_2$, Li[Ni$_{0.49}$Mn$_{0.3}$Co$_{0.2}$Mg$_{0.01}$]O$_2$ and the like, having a charge/discharge region at 4.3 V or more.

((B) Lithium Manganese Composite Oxide Having Spinel Structure)

Positive Electrode Active Material (B): Examples of the lithium-manganese composite oxide having a spinel structure include spinel type lithium-manganese composite oxide represented by the following general formula (1-3).

$$Li_j(Mn_{2-k}M^3_k)O_4 \qquad (1\text{-}3)$$

In the formula (1-3), $M^3$ is at least one metal element selected from the group consisting of Ni, Co, Fe, Mg, Cr, Cu, Al and Ti, j satisfies $1.05 \le j \le 1.15$, and k satisfies $0 \le k \le 0.20$.

Specific examples thereof include LiMn$_2$O$_4$, LiMn$_{1.95}$Al$_{0.05}$O$_4$, LiMn$_{1.9}$Al$_{0.1}$O$_4$, LiMn$_{1.9}$Ni$_{0.1}$O$_4$, LiMn$_{1.3}$Ni$_{0.5}$O$_4$ and the like.

((C) Lithium-Containing Olivine Type Phosphate)

Positive Electrode Active Material (C): Examples of the lithium-containing olivine type phosphate include those represented by the following general formula (1-4).

$$LiFe_{1-n}M^4_nPO_4 \qquad (1\text{-}4)$$

In the formula (1-4), $M^4$ is at least one selected from Co, Ni, Mn, Cu, Zn, Nb, Mg, Al, Ti, W, Zr and Cd, and n satisfies $0 \le n \le 1$.

Specific examples thereof include LiFePO$_4$, LiCoPO$_4$, LiNiPO$_4$, LiMnPO$_4$ and the like, and LiFePO$_4$ and/or LiMnPO$_4$ are preferable.

((D) Lithium-Excess Layered Transition Metal Oxide)

Positive Electrode Active Material (D): Examples of the lithium-excess layered transition metal oxide having a layered rock salt type structure include those represented by the following general formula (1-5).

$$xLiM^5O_2 \cdot (1-x)Li_2M^6O_3 \qquad (1\text{-}5)$$

In the formula (1-5), x is a number satisfying $0 < x < 1$ and $M^5$ is at least one metal element having an average oxidation number of $3^+$, and $M^6$ is at least one metal element having an average oxidation number of $4^+$. In the formula (1-5), $M^5$ is preferably one metal element selected from trivalent Mn, Ni, Co, Fe, V, and Cr, but the equivalent amounts of divalent and tetravalent metals may make an average oxidation number of trivalence.

In the formula (1-5), $M^6$ is preferably at least one metal element selected from Mn, Zr and Ti. Specific examples thereof include 0.5[LiNi$_{0.5}$Mn$_{0.5}$O$_2$ ].0.5[Li$_2$MnO$_3$], 0.5 [LiNi$_{1/3}$Co$_{1/3}$Mn$_{1/3}$O$_2$].0.5[Li$_2$MnO$_3$], 0.5 [LiNi$_{0.375}$Co$_{0.25}$Mn$_{0.375}$O$_2$ ].0.5[Li$_2$MnO$_3$], 0.5 [LiNi$_{0.375}$Co$_{0.125}$Fe$_{0.125}$Mn$_{0.375}$O$_2$ ].0.5[Li$_2$MnO$_3$ ], 0.45 [LiNi$_{0.375}$Co$_{0.25}$Mn$_{0.375}$O$_2$ ].0.10[Li$_2$TiO$_3$].0.45[Li$_2$MnO$_3$] and the like.

It has been known that the positive electrode active material (D) represented by this general formula (1-5) exhibits high capacity at high voltage charge of 4.4 V (Li basis) or more (for example, U.S. Pat. No. 7,135,252).

These positive electrode active materials can be prepared, for example, according to the production method mentioned in JP 2008-270201 A, WO 2013/118661 A, JP 2013-030284 A and the like.

As the positive electrode active material, it is sufficient that at least one selected from the above (A) to (D) is contained as a main component, and examples of other substances to be contained therein include transition element chalcogenides such as FeS$_2$, TiS$_2$, V$_2$O$_5$, MoO$_3$, MoS$_2$ and the like; conductive polymers such as polyacetylene, polyparaphenylene, polyaniline and polypyrrole; activated carbon; polymers capable of generating radicals; carbon materials and the like.

[Positive Electrode Current Collector]

(ii) The positive electrode has a positive electrode current collector. It is possible to use, as the positive electrode current collector, for example, aluminum, stainless steel, nickel, titanium, alloys thereof and the like.

[Positive Electrode Active Material Layer]

(ii) In the positive electrode, for example, a positive electrode active material layer is formed on at least one surface of the positive electrode current collector. The positive electrode active material layer is made of, for example, the above-mentioned positive electrode active material, a binder, and if necessary, a conductive agent.

Examples of the binder include polytetrafluoroethylene, polyvinylidene fluoride, styrene-butadiene rubber (SBR) resin and the like.

It is possible to use, as the conductive agent, for example, carbon materials such as acetylene black, ketjen black, carbon fibers, graphite (granular graphite and flake graphite). In the positive electrode, acetylene black, ketjen black or the like having low crystallinity is preferably used.

[(iii) Negative Electrode]

(iii) The negative electrode preferably contains at least one negative electrode active material.

[Negative Electrode Active Material]

In the case of a lithium ion secondary battery in which the cation in a nonaqueous electrolyte solution is mainly lithium, the negative electrode active material constituting (iii) the negative electrode is capable of doping and de-doping lithium ions and examples thereof include those materials comprising at least one selected from (E) carbon materials in which the d value of the lattice plane (002 plane) in X-ray diffraction is 0.340 nm or less, (F) carbon materials in which the d value of the lattice plane (002 plane) in X-ray diffraction exceeds 0.340 nm, (G) oxides of one or more metals selected from Si, Sn and Al, (H) one or more metals selected from Si, Sn and Al, alloys containing these metals, and alloys of these metals or alloys and lithium, and (I) lithium titanium oxides. These negative electrode active materials can be used alone or in combination of two or more thereof.

((E) Carbon Material in which d Value of Lattice Plane (002 Plane) in X-Ray Diffraction is 0.340 nm or Less)

Negative Electrode Active Material (E): Examples of the carbon material in which the d value of the lattice plane (002 plane) in X-ray diffraction is 0.340 nm or less include pyrolytic carbons, cokes (for example, pitch coke, needle coke, petroleum coke, etc.), graphites, organic polymer compound fired bodies (for example, those obtained by carbonizing by calcination, phenol resin, furan resin and the like at an appropriate temperature), carbon fibers, activated carbon and the like, and these materials may be graphitized. The carbon material is carbon material in which a spacing (d002) of the (002) plane measured by the X-ray diffraction method is 0.340 nm or less, and particularly preferably a graphite having a true density of 1.70 $g/cm^3$ or more or a highly crystalline carbon material having properties close thereto.

((F) Carbon Material in which d Value of Lattice Plane (002 Plane) in X-Ray Diffraction Exceeds 0.340 nm)

Negative Electrode Active Material (F): The carbon material in which the d value of lattice plane (002 plane) in X-ray diffraction exceeds 0.340 nm includes amorphous carbon, which is a carbon material whose stacking order hardly changes even when heat-treated at a high temperature of 2,000° C. or higher, and examples thereof include hardly-graphitizable carbon (hard carbon), mesocarbon microbeads (MCMB) and mesophase pitch carbon fiber (MCF) fired at 1,500° C. or lower. CARBOTRON (registered trademark) P manufactured by KUREHA Corporation is a typical example thereof.

((G) Oxides of One or More Metals Selected from Si, Sn and Al)

Negative Electrode Active Material (G): Examples of the oxide of one or more metals selected from Si, Sn and Al include silicon oxide and tin oxide, capable of doping and de-doping lithium ions.

There is $SiO_x$ having a structure in which ultrafine particles of Si are dispersed in $SiO_2$. When this material is used as a negative electrode active material, charge/discharge is smoothly performed since Si reacting with Li is in the form of ultrafine particles, while the $SiO_x$ particles having the above-mentioned structure have a small surface area, and therefore exhibits satisfactory paintability when formed into a composition (paste) for formation of a negative electrode active material layer, and satisfactory adhesion to a current collector of a negative electrode mixture layer.

Since $SiO_x$ causes large change in volume due to charge/discharge, it is possible to simultaneously achieve high capacity and satisfactory charge/discharge cycle characteristics by using $SiO_x$ and the graphite of the negative electrode active material (E) as the negative electrode active material at a specific ratio.

((H) One or More Metals Selected from Si, Sn and Al, Alloys Containing these Metals, Alloys of these Metals or Alloys and Lithium)

Negative Electrode Active Material (H): Examples of one or more metals selected from Si, Sn and Al, alloys containing these metals, and alloys of these metals or alloys and lithium include metals such as silicon, tin and aluminum, silicon alloys, tin alloys, aluminum alloys and the like. It is also possible to use materials in which these metals and alloys are alloyed with lithium during charge/discharge.

Preferred examples of these materials are mentioned in WO 2004/100293 A, JP 2008-016424 A and the like. Examples thereof include simple metals such as silicon (Si) and tin (Sn) (for example, powdery metals), alloys of such metals, compounds containing the metals, alloys containing tin (Sn) and cobalt (Co) in the metal and the like. The metal is preferably used for an electrode since high charge capacity can be exhibited, and volume expansion/contraction due to charge/and discharge occurs comparatively scarcely. There has been known that, when these metals are used in the negative electrode of a lithium ion secondary battery, high charge capacity is exhibited since they are alloyed with Li during charge, and these metals are also preferable in this respect.

It is also possible to use a negative electrode active material formed of silicon pillars having a submicron diameter, a negative electrode active material formed of fibers composed of silicon and the like mentioned in WO 2004/042851 A and WO 2007/083155 A.

((I) Lithium Titanium Oxide)

Negative Electrode Active Material (I): Examples of lithium titanium oxide include lithium titanate having a spinel structure, lithium titanate having a ramsdellite structure and the like.

Examples of lithium titanate having a spinel structure include $Li_{4+\alpha}Ti_5O_{12}$ ($\alpha$ changes in a range of $0 \leq \alpha \leq 3$ due to charge/discharge reaction). Examples of the lithium titanate having a ramsdellite structure include $Li_{2+\beta}Ti_3O_7$ ($\beta$ changes in a range of $0 \leq \beta \leq 3$ by charge/discharge reaction). These negative electrode active materials can be prepared, for example, according to the production methods mentioned in JP 2007-18883 A, JP 2009-176752 A, and the like.

For example, in the case of a sodium ion secondary battery in which the cation in a nonaqueous electrolyte solution is mainly sodium, hard carbon, oxides such as $TiO_2$, $V_2O_5$ and $MoO_3$ are used as the negative electrode active material. For example, in the case of a sodium ion secondary battery in which the cation in a nonaqueous electrolyte solution is mainly sodium, it is possible to use, as the positive electrode active material, sodium-containing transition metal composite oxides such as $NaFeO_2$, $NaCrO_2$, $NaNiO_2$, $NaMnO_2$ and $NaCoO_2$; those in which a plurality of transition metals such as Fe, Cr, Ni, Mn and Co of the sodium-containing transition metal composite oxides are mixed; those in which a part of the transition metals of those sodium-containing transition metal composite oxides is substituted with metals other than the transition metals; phosphoric acid compounds of transition metals, such as $Na_2FeP_2O_7$ and $NaCo_3(PO_4)_2P_2O_7$; sulfides such as $TiS_2$ and $FeS_2$; conductive polymers such as polyacetylene, polyparaphenylene, polyaniline and polypyrrole; activated carbon; polymers capable of generating radicals; carbon materials and the like.

[Negative Electrode Current Collector]

(iii) The negative electrode has a negative electrode current collector. It is possible to use, as the negative electrode current collector, for example, copper, aluminum, stainless steel, nickel, titanium or alloys thereof.

[Negative Electrode Active Material Layer]

In (iii) the negative electrode, for example, a negative electrode active material layer is formed on at least one surface of a negative electrode current collector. The negative electrode active material layer is made of, for example, the above-mentioned negative electrode active material, a binder, and if necessary, a conductive agent.

Examples of the binder include polytetrafluoroethylene, polyvinylidene fluoride, or styrene-butadiene rubber (SBR) resin.

It is possible to use, as the conductive agent, for example, carbon materials such as acetylene black, ketjen black, carbon fiber, graphite (granular graphite and flake graphite).

[Method for Producing Electrode ((ii) Positive Electrode and (iii) Negative Electrode)]

The electrode may be obtained, for example, by dispersing an active material, a binder, and if necessary, a conductive agent in a predetermined amount in a solvent such as N-methyl-2-pyrrolidone (NMP) or water, kneading the mixture, applying the resulting paste on a current collector and drying the paste to form an active material layer. The electrode thus obtained is preferably compressed by a method such as a roll press to adjust to an electrode having an appropriate density.

[(iv) Separator]

The above nonaqueous secondary battery includes (iv) a separator. It is possible to use, as the separator for preventing contact between (ii) the positive electrode and (iii) the negative electrode, a nonwoven fabric, a porous sheet or the like made of polyolefins such as polypropylene and polyethylene, cellulose, paper, glass fibers and the like. It is preferable that these films are microporous so that the electrolyte solution penetrates, leading to easy permeation of ions.

Examples of the polyolefin separator include a film which electrically insulates between the positive electrode and the negative electrode, and is permeable to lithium ions, for example a microporous polymer film such as a porous polyolefin film. Specific examples of the porous polyolefin film include a porous polyethylene film alone, or a porous polyethylene film and a porous polypropylene film may be stacked and used as a multilayer film. Moreover, a composite film of the porous polyethylene film and the polypropylene film is also exemplified.

[Case]

In assembling a nonaqueous secondary battery, a metal can such as a coin-type, cylindrical or square metal can, or a laminate case may be used. Examples of the metal can material include a nickel-plated steel sheet, a stainless steel sheet, a nickel-plated stainless steel sheet, aluminum or alloys thereof, nickel, titanium and the like.

It is possible to use, as the laminate case, for example, an aluminum laminate film, a laminate film made of SUS, a polypropylene coated with silica, a laminate film of polyethylene and the like.

The configuration of the nonaqueous secondary battery according to the present embodiment is not particularly limited, and it is possible to employ the configuration in which an electrode element comprising a positive electrode and a negative electrode disposed opposite to each other and a nonaqueous electrolyte solution are included in a case. The shape of the nonaqueous secondary battery is not particularly limited, and an electrochemical device having a coin shape, a cylindrical shape, a square shape, an aluminum laminate sheet type shape or the like can be assembled from the above elements.

EXAMPLES

The present invention will be specifically described by way of Examples and the scope of the present invention is not limited in no way to these Examples.

To eliminate the influence other than the water content of a reaction solvent as much as possible, handling of raw materials and solvents was performed in a nitrogen atmosphere having a dew point of −50° C. or lower. A glass reactor was used after drying at 150° C. for 12 hours or more and cooling to room temperature under nitrogen flow having a dew point of −50° C. or lower. The water content in the reaction solvent was determined by common Karl Fischer titration.

Anions A of phosphoryl imide salts (1) and (2) used in the respective Examples and Comparative Example, and anions A' of the following sulfonyl imide salts used in the Reference examples are shown in Table 1 below. CF3 means a trifluoromethyl group, CH3 means a methyl group, vinyl means a vinyl group, OMe means a methoxy group, O-Prpg means a propargyloxy group, O-HFIP means a 1,1,1,3,3,3-hexafluoro-2-propoxy group, and O-TFE means a 2,2,2-trifluoroethoxy group. Hereinafter, for example, the phosphoryl imide salt (1) in which the anion A is a is referred to as (1a-M), the phosphoryl imide salt (2) in which the anion A is a is referred to as (2a-M), and b to l are similarly referred. M is a counter cation.

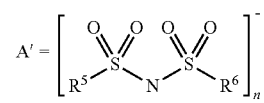

(3)

N is a nitrogen atom, S is a sulfur atom, and $R_5$ and $R_6$ are each independently selected from a fluorine atom, an alkyl group, an alkoxy group, an alkenyl group, an alkenyloxy group, an alkynyloxy group and an aryloxy group.

In Reference Examples, imide salts are referred to as follows.

A sulfonyl imide salt (3) in which an anion is x shown in Table 1 and a cation is lithium is referred to as (3x-Li), a sulfonyl imide salt (3) in which an anion is x shown in Table 1 and a cation is a tertiary ammonium in which triethylamine is protonated is referred to as (3x-Et3N.H), a sulfonyl imide salt (3) in which an anion is y shown in Table 1 and a cation is lithium is referred to as (3y-Li), and a sulfonyl imide salt (3) in which an anion is y shown in Table 1 and a cation is a tertiary ammonium in which triethylamine is protonated is referred to as (3y-Et3N.H).

TABLE 1

| | Anion A of phosphoryl imide salts (1) and (2) | | | | | Anion A' of sulfonyl imide salt | | |
|---|---|---|---|---|---|---|---|---|
| Type | X | R1 | R2 | R3 | R4 | Type | R5 | R6 |
| a | S | F | F | CF3 | — | x | F | F |
| b | S | F | F | CH3 | — | y | CF3 | CF3 |
| c | S | F | F | vinyl | — | — | — | — |
| d | S | F | F | OMe | — | — | — | — |
| e | S | F | F | O-Prpg | — | — | — | — |
| f | S | F | F | O-HFIP | — | — | — | — |
| g | S | F | F | O-TFE | — | — | — | — |
| h | S | F | F | F | — | — | — | — |
| i | S | OMe | OMe | CF3 | — | — | — | — |
| j | S | OMe | OMe | O-HFIP | — | — | — | — |
| k | P | OMe | OMe | F | F | — | — | — |
| l | P | F | F | F | F | — | — | — |

As the phosphoryl imide salt (2) having an anion A, and raw materials thereof, those synthesized in the following manner and commercially available products were used.

[Synthesis of Raw Material of Phosphoryl Imide Salt (2) (Potassium Difluorophosphate)]

After hydrolyzing potassium hexafluorophosphate with 2 equivalents of water, by-produced hydrogen fluoride was removed by concentration under reduced pressure to obtain potassium difluorophosphate which is a raw material of the below-mentioned phosphoryl imide salt.

[Synthesis of Raw Material of Phosphoryl Imide Salt (2) (Phosphorus Oxydifluoride Chloride)]

According to the description of Non-Patent Document 2, potassium difluorophosphate synthesized in advance using phosphorus oxychloride as a solvent was reacted with phosphorus pentachloride, and then the temperature of an oil bath was raised to 110° C. thereby performing distillation under reflux in phosphorus oxychloride to obtain phosphorus oxydifluorochloride as a raw material of the below-described phosphoryl imide salt.

[Synthesis of Raw Material of Phosphoryl Imide Salt (2) (Dimethyl Chlorophosphate)]

According to the description of Non-patent Document 3, dimethyl phosphite (Tokyo Chemical Industry Co., Ltd.) was chlorinated with trichloroisocyanuric acid (Tokyo Chemical Industry Co., Ltd.) in an acetonitrile solvent to obtain dimethyl chlorophosphate which is a raw material of the below-described phosphoryl imide salt.

[Synthesis of Raw Material of Phosphoryl Imide Salt (2) (Sulfamic Acid Chloride)]

According to the description of Non-Patent Document 4, sulfonyl chloroisocyanate (product available from Tokyo Chemical Industry Co., Ltd.) was gently decomposed with formic acid to obtain sulfamic acid chloride which is a raw material of the below-mentioned phosphoryl imide salt.

[Synthesis of Raw Material: Phosphoryl Imide Salt (2a-Et3N.H)]

Trifluoromethanesulfonamide (product available from Tokyo Chemical Industry Co., Ltd.) was reacted with phosphorus oxydifluorochloride synthesized in advance in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2a-Et3N.H). Et3N.H means a tertiary ammonium cation in which a protonated form of triethylamine.

[Synthesis of Raw Material: Phosphoryl Imide Salt (2b-Et3N.H)] Methanesulfonamide (product available from. Tokyo Chemical Industry Co., Ltd.) was reacted with phosphorus oxydifluorochloride synthesized in advance in an ethyl methyl carbonate solvent in the presence of triethylamine. By-produced triethylamine hydrochloride was removed by filtration, and then the reaction product was purified by recrystallizing from an ethyl methyl carbonate/ methylene chloride system to obtain a phosphoryl imide salt (2b-Et3N.H).

[Synthesis of Raw Material: Phosphoryl Imide Salt (2c-Et3N.H)]

By reacting 2-chloroethanesulfonyl chloride (product available from Tokyo Chemical Industry Co., Ltd.) with ammonia in an ethyl methyl carbonate solvent in the presence of triethylamine, nucleophilic addition of ammonia and formation of a double bond due to elimination of hydrochloric acid proceeded to obtain vinyl sulfonamide. Furthermore, the subsequent imidization reaction was allowed to proceed by adding triethylamine and adding phosphorus oxydifluorochloride synthesized in advance. By-produced triethylamine hydrochloride was removed by filtration, and then the reaction product was purified by recrystallizing from an ethyl methyl carbonate/methylene chloride system to obtain a phosphoryl imide salt (2c-Et3N.H).

[Synthesis of Raw Material: Phosphoryl Imide Salt (2d-Et3N.H)]

Sulfamic acid chloride synthesized in advance was reacted with methanol to obtain a sulfamic acid methyl ester. The sulfamic acid methyl ester thus obtained was reacted with phosphorus oxydifluorochloride synthesized in advance, in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2d-Et3N.H).

[Synthesis of Raw Material: Phosphoryl Imide Salt (2e-Et3N.H)]

Sulfamic acid chloride synthesized in advance was reacted with propargyl alcohol to obtain a sulfamic acid propargyl ester. The sulfamic acid propargyl ester thus obtained was reacted with phosphorus oxydifluorochloride synthesized, in advance in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2e-Et3N.H).

[Synthesis of Raw Material: Phosphoryl Imide Salt (2f-Et3N.H)]

Sulfamic acid chloride synthesized in advance was reacted with hexafluoroisopropanol to obtain a sulfamic acid hexafluoroisopropyl ester. The sulfamic acid hexafluoroisopropyl ester thus obtained was reacted with phosphorus oxydifluorochloride synthesized in advance, in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2f-Et3N.H).

[Synthesis of Raw Material: Phosphoryl Imide Salt (2 g-Et3N.H)]

Sulfamic acid chloride synthesized in advance was reacted with trifluoroethanol to obtain a sulfamic acid trifluoroethyl ester. The sulfamic acid trifluoroethyl ester thus obtained was reacted with phosphorus oxydifluorochloride synthesized in advance, in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2g-Et3N

[Synthesis of Raw Material: Phosphoryl Imide Salt (2h-Et3N.H)]

Sulfamic acid chloride synthesized in advance was fluorinated with potassium fluoride to obtain sulfamic acid fluoride. The sulfamic acid fluoride thus obtained was reacted with phosphorus oxydifluorochloride synthesized in advance, in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2h-Et3N.H).

[Synthesis of Raw Material: Phosphoryl Imide Salt (2i-Et3N.H)]

Trifluoromethanesulfonamide (product available from Tokyo Chemical Industry Co., Ltd.) was reacted with dimethyl chlorophosphate synthesized in advance, in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2i-Et3N.H).

[Synthesis of Raw Material: Phosphoryl Imide Salt (2j-Et3N.H)]

Sulfamic acid chloride synthesized in advance was reacted with hexafluoroisopropanol to obtain a sulfamic acid hexafluoroisopropyl ester. The sulfamic acid hexafluoroisopropyl ester thus obtained was reacted with dimethyl chlorophosphate synthesized in advance, in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2j-Et3N.H).

[Synthesis of Raw Material: Phosphoryl Imide Salt (2k-Et3N.H)]

Phosphorus oxydifluorochloride synthesized in advance was reacted with hexamethyldisilazane to obtain N-trimethylsilyldifluorophosphoric acid amide. This N-trimethylsilyldifluorophosphoric acid amide was reacted with dimethyl chlorophosphate synthesized in advance, in an ethyl methyl carbonate solvent in the presence of triethylamine. By-produced triethylamine hydrochloride was removed by filtration, and then the reaction product was purified by recrystallizing from an ethyl methyl carbonate/methylene chloride system to obtain a phosphoryl imide salt (2k-Et3N.H).

[Synthesis of Raw Material: Phosphoryl Imide Salt (2l-Et3N.H)]

Phosphorus oxydifluorochloride synthesized in advance (2 equivalents) was reacted with hexamethyldisilazane in the presence of triethylamine. By-produced triethylamine hydrochloride was removed by filtration, and then the reaction product was purified by recrystallizing from an ethyl methyl carbonate/methylene chloride system to obtain a phosphoryl imide salt (2l-Et3N.H).

Those whose counter cation is other than Et3N.H were synthesized by changing a tertiary organic base used in the reaction from triethylamine to tri-n-butylamine, pyridine, tetramethylethylenediamine and 2,2'-bipyridine, respectively.

[Pretreatment of Ion Exchange Resin]

After weighing 500 g of a strong acid cation exchange resin 252 manufactured by Dow Chemical Co. (hereinafter referred simply to as "ion exchange resin"), the cation exchange resin was immersed in an aqueous 0.1N lithium hydroxide solution (2.5 kg), followed by stirring at 30° C. for 12 hours. The ion exchange resin was recovered by filtration and thoroughly washed with pure water until the pH of the wash liquid became 8 or lower. Thereafter, moisture was removed by vacuum drying (120° C., 1.3 kPa) for 24 hours.

Reference Example 1-1

With reference to the method mentioned in Patent Document 6, a sulfonyl imide salt (3x-Et3N.H) (5.6 g, 20.0 mmol) was dissolved in 22.6 g of water and 30.0 g of the pretreated ion exchange resin was added thereto, followed by stirring at 30° C. for 6 hours. After removing the ion exchange resin by filtration, extraction was performed twice with butyl acetate (20.0 g) and the recovered organic layers were mixed, and then butyl acetate and water were distilled off by concentration under reduced pressure. The resulting solid was analyzed by F-NMR to confirm only a sulfonylimide anion (3x). A ratio of the cation was determined by ion chromatography to find that the ratio of Li/Et3N.H was 99.0. As a result, the ion exchange yield to the sulfonylimide salt (3x-Li) calculated according to the following formula was 99%.

"Anion purity (%)" of the following formula is the purity (equivalent to the anion component) of the objective imide salt determined by F-NMR or P-NMR measurement, and "cation purity (%)" is the purity of the objective cation (herein, lithium) determined by ion chromatography.

Ion exchange yield (%)=anion purity (%)×cation purity (%)

Reference Example 1-2

A sulfonyl imide salt (3y-Et3N.H) (7.6 g, 20.0 mmol) was dissolved in water (30.6 g) and 30.0 g of the pretreated ion exchange resin was added thereto, followed by stirring at 30° C. for 6 hours. After removing the ion exchange resin by filtration, extraction was performed twice with butyl acetate (20.0 g) and the recovered organic layers were mixed, and then butyl acetate and water were distilled off by concentration under reduced pressure. The ion exchange yield to the sulfonyl imide salt (3y-Li) determined by F-NMR and ion chromatography analysis of the obtained solid was 99%.

Comparative Example 1-1

A phosphoryl imide salt (2a-Et3N.H) (6.7 g, 20.0 mmol) was dissolved in water (26.7 g) and 30.0 g of the pretreated ion exchange resin (2.0 equivalents) was added thereto, followed by stirring at 30° C. for 6 hours. After removing the ion exchange resin by filtration, extraction was performed twice with butyl acetate (20.0 g) and the recovered organic layers were mixed, and then butyl acetate and water were distilled off by concentration under reduced pressure. The resulting solid was analyzed by F-NMR to be found that the purity of the phosphoryl imide anion (1a) was 5%. Therefore, it was found that the ion exchange yield to the phosphoryl imide salt (1a-Li) was less than 5% without analyzing the cation by ion chromatography.

Comparative Example 1-2

A phosphoryl imide salt (2a-Et3N.H) (6.7 g, 20.0 mmol) was dissolved in ethyl methyl carbonate (water content: 1.0% by mass, 26.7 g: the amount in which the concentration of the phosphoryl imide salt (2a-Et3N.H) charged became 20% by mass) and 30.0 g of the pretreated ion exchange resin (2.0 equivalents) was added thereto, followed by stirring at 30° C. for 6 hours. After removing the ion exchange resin by filtration, the ion exchange yield to the phosphoryl imide salt (1a-Li) determined by F-NMR and ion chromatography analysis of the resulting liquid was 37%.

Comparative Example 1-3

In the same manner as in Comparative Example 1-2, except that ethyl methyl carbonate to be used was changed to that having a water content of 0.7% by mass, analysis was performed, thus finding that the ion exchange yield to the phosphoryl imide salt (1a-Li) was 45%.

Example 1-1

In the same manner as in Comparative Example 1-2, except that ethyl methyl carbonate to be used was changed to that having a water content of 0.1% by mass, analysis was performed, thus finding that the ion exchange yield to the phosphoryl imide salt (1a-Li) was 90%.

Example 1-2

In the same manner as in Comparative Example 1-2, except that ethyl methyl carbonate to be used was changed to that having a water content of 0.02% by mass, analysis was performed, thus finding that the ion exchange yield to the phosphoryl imide salt (1a-Li) was 99%.

Comparative Example 1-4

In the same manner as in Example 1-1, except that the raw material to be used was changed to (2l-Et3N.H), analysis was performed, thus finding that the ion exchange yield to the phosphoryl imide salt (1l-Li) was less than 5%.

Comparative Example 1-5

In the same manner as in Example 1-2, except that the raw material to be used was changed to (2l-Et3N.H), analysis was performed, thus finding that the ion exchange yield to the phosphoryl imide salt (1l-Li) was 30%.

Comparative Example 1-6

In the same manner as in Comparative Example 1-3, except that the raw material to be used was changed to (2l-Et3N.H), analysis was performed, thus finding that the ion exchange yield to the phosphoryl imide salt (1l-Li) was 38%.

Example 1-3

In the same manner as in Example 1-1, except that the raw material to be used was changed to (2l-Et3N.H), analysis was performed, thus finding that the ion exchange yield to the phosphoryl imide salt (1l-Li) was 86%.

Example 1-4

In the same manner as in Example 1-2, except that the raw material to be used was changed to (2l-Et3N.H), analysis was performed, thus finding that the ion exchange yield to the phosphoryl imide salt (1l-Li) was 98%.

The above results are collectively shown in Table 2 below.

TABLE 2

| | Anion A or A' | Counter cation Raw material | Product | Water content in solvent [% by mass] | Ion exchange yield [%] |
|---|---|---|---|---|---|
| Reference Example 1-1 | x | Et3N · H | Li | 100 | 99 |
| Reference Example 1-2 | y | Et3N · H | Li | 100 | 99 |
| Comparative Example 1-1 | a | Et3N · H | Li | 100 | <5 |
| Comparative Example 1-2 | a | Et3N · H | Li | 1.0 | 37 |
| Comparative Example 1-3 | a | Et3N · H | Li | 0.7 | 45 |
| Example 1-1 | a | Et3N · H | Li | 0.1 | 90 |
| Example 1-2 | a | Et3N · H | Li | 0.02 | 99 |
| Comparative Example 1-4 | l | Et3N · H | Li | 100 | <5 |
| Comparative Example 1-5 | l | Et3N · H | Li | 1.0 | 30 |
| Comparative Example 1-6 | l | Et3N · H | Li | 0.7 | 38 |
| Example 1-3 | l | Et3N · H | Li | 0.1 | 86 |
| Example 1-4 | l | Et3N · H | Li | 0.02 | 98 |

Considerations are made on the above results. As shown in the results of Reference Examples 1-1 and 1-2, ion exchange of the sulfonyl imide salt is quantitatively completed in an aqueous solution system, but when the phosphoryl imide salt was treated under the same conditions, a product can be hardly obtained (Comparative Examples 1-1 and 1-4). This is because the phosphoryl imide salt was decomposed in the step of the ion exchange treatment. Then, when the water content was greatly reduced to 1.0% by mass (Comparative Examples 1-2 and 1-5), an improvement in ion exchange yield was certainly observed, but the ion exchange yield was insufficient value of 37% and 30%, respectively. When the water content was further reduced to 0.7% by mass (Comparative Examples 1-3 and 1-6), further improvement in ion exchange yield was observed, but the ion exchange yield was also insufficient value of 45% and 38%, respectively.

Meanwhile, when the ion exchange treatment was performed by reducing the water content to 0.1% by mass (Examples 1-1 and 1-3), the ion exchange yield was significantly improved to 90% and 86%, respectively. Furthermore, when the ion exchange treatment was performed by reducing the water content to 0.02% by mass (Examples 1-2 and 1-4), it was confirmed that the ion exchange yield can be further improved to 99% and 98%, respectively.

As mentioned above, it was possible to find the conditions under which the ion exchange using the ion exchange resin can be efficiently performed. However, the ion exchange resin has such a disadvantage that it is required to be pretreated in advance and is very bulky because of its low bulk density, leading to low utilization efficiency of a reaction vessel. Since the ion exchange resin is relatively expensive, an ion exchange method replacing the method using the ion exchange resin is required. In this Example, a study was also made on a salt exchange method using a metal salt as mentioned below. To eliminate the influence of the water content other than the reaction solvent, a metal salt (lithium chloride, sodium chloride) to be used for ion exchange was dried under reduced pressure at 150° C. for 24 hours.

Comparative Example 2-1

A phosphoryl imide salt (2a-Et3N.H) (6.7 g, 20.0 mmol) was dissolved in ethyl methyl carbonate (water content: 1.0% by mass, 26.7 g: the amount in which the concentration of the phosphoryl imide salt (2a-Et3N.H) charged became 20% by mass) and lithium chloride (1.0 g, 24.0 mmol, 1.2 equivalents) as a metal salt was added thereto, followed by stirring at 30° C. for 12 hours. After removing excess lithium chloride and by-produced triethylamine hydrochloride by filtration, the resulting liquid was analyzed by F-NMR and ion chromatography, thus finding that the ion exchange yield to the phosphoryl imide salt (1a-Li) was 29%. The results are shown in Table 3.

[Comparative Examples 2-2 to 2-8] [Examples 2-1 to 2-32]

While the counter cation of the raw material was set as tertiary ammonium in which triethylamine was protonated, the anion A was changed to a to 1, the metal salt for ion exchange was changed to lithium chloride or sodium chloride, the water content in ethyl methyl carbonate was changed to 1.0, 0.7, 0.1, 0.02, 0.005 or 0.0002% by mass, and anion exchange treatment was performed in the same manner as in Comparative Example 2-1. The results are shown in Table 3.

| | Anion A or A' | Counter cation Raw material | Product | Water content in solvent [% by mass] | Ion exchange yield [%] |
|---|---|---|---|---|---|
| Comparative Example 2-1 | a | Et3N·H | Li | 1.0 | 29 |
| Comparative Example 2-2 | a | Et3N·H | Li | 0.7 | 35 |
| Example 2-1 | a | Et3N·H | Li | 0.1 | 88 |
| Example 2-2 | a | Et3N·H | Li | 0.02 | 97 |
| Example 2-3 | a | Et3N·H | Li | 0.005 | 98 |
| Example 2-4 | a | Et3N·H | Li | 0.0002 | 96 |
| Comparative Example 2-3 | a | Et3N·H | Na | 1.0 | 33 |
| Comparative Example 2-4 | a | Et3N·H | Na | 0.7 | 42 |
| Example 2-5 | a | Et3N·H | Na | 0.1 | 87 |
| Example 2-6 | a | Et3N·H | Na | 0.02 | 96 |
| Example 2-7 | a | Et3N·H | Na | 0.005 | 94 |
| Example 2-8 | a | Et3N·H | Na | 0.0002 | 90 |
| Example 2-9 | b | Et3N·H | Li | 0.1 | 90 |
| Example 2-10 | b | Et3N·H | Li | 0.02 | 96 |
| Example 2-11 | c | Et3N·H | Li | 0.1 | 87 |
| Example 2-12 | c | Et3N·H | Li | 0.02 | 97 |
| Example 2-13 | d | Et3N·H | Li | 0.1 | 84 |
| Example 2-14 | d | Et3N·H | Li | 0.02 | 95 |
| Example 2-15 | e | Et3N·H | Li | 0.1 | 86 |
| Example 2-16 | e | Et3N·H | Li | 0.02 | 98 |
| Example 2-17 | f | Et3N·H | Li | 0.1 | 82 |
| Example 2-18 | f | Et3N·H | Li | 0.02 | 99 |
| Example 2-19 | g | Et3N·H | Li | 0.1 | 85 |
| Example 2-20 | g | Et3N·H | Li | 0.02 | 98 |
| Example 2-21 | h | Et3N·H | Li | 0.1 | 85 |
| Example 2-22 | h | Et3N·H | Li | 0.02 | 97 |
| Example 2-23 | i | Et3N·H | Li | 0.1 | 87 |
| Example 2-24 | i | Et3N·H | Li | 0.02 | 95 |
| Example 2-25 | j | Et3N·H | Li | 0.1 | 83 |
| Example 2-26 | j | Et3N·H | Li | 0.02 | 94 |
| Example 2-27 | k | Et3N·H | Li | 0.1 | 85 |
| Example 2-28 | k | Et3N·H | Li | 0.02 | 96 |
| Comparative Example 2-5 | l | Et3N·H | Li | 1.0 | 25 |
| Comparative Example 2-6 | l | Et3N·H | Li | 0.7 | 32 |
| Example 2-29 | l | Et3N·H | Li | 0.1 | 82 |
| Example 2-30 | l | Et3N·H | Li | 0.02 | 95 |
| Comparative Example 2-7 | l | Et3N·H | Na | 1.0 | 29 |
| Comparative Example 2-8 | l | Et3N·H | Na | 0.7 | 36 |
| Example 2-31 | l | Et3N·H | Na | 0.1 | 87 |
| Example 2-32 | l | Et3N·H | Na | 0.02 | 96 |

Comparative Example 3-1

A phosphoryl imide salt (2a-Bu3N.H) (8.4 g, 20.0 mmol) was dissolved in ethyl methyl carbonate (water content: 1.0% by mass, 33.5 g: the amount in which the concentration of the phosphoryl imide salt (2a-Bu3N.H) charged became 20% by mass) and lithium chloride (1.0 g, 24.0 mmol, 1.2 equivalents) as a metal salt was added thereto, followed by stirring at 30° C. for 12 hours. After removing excess lithium chloride and by-produced triethylamine hydrochloride by filtration, the resulting liquid was analyzed by F-NMR and ion chromatography, thus finding that the ion exchange yield to the phosphoryl imide salt (1a-Li) was 30%. The results are shown in Table 4. Bu3N.H means a tertiary ammonium cation in which a protonated form of tri-n-butylamine.

[Comparative Example 3-2] [Examples 3-1 to 3-10]

While the cation of the raw material was set as tertiary ammonium in which tri-n-butylamine was protonated, the anion A was changed to a, d or l, the metal salt for ion exchange was changed to lithium chloride or sodium chloride, the water content in ethyl methyl carbonate was changed to 0.7, 0.1 or 0.02% by mass, and an ion exchange treatment was performed in the same manner as in Comparative Example 3-1. The results are shown in Table 4.

Comparative Example 4-1

A phosphoryl imide salt (2a-Py.H) (6.2 g, 20.0 mmol) was dissolved in ethyl methyl carbonate (water content: 1.0% by mass, 25.0 g: the amount in which the concentration of the phosphoryl imide salt (2a-Py.H) charged became 20% by mass) and lithium chloride (1.0 g, 24.0 mmol, 1.2 equivalents) as a metal salt was added thereto, followed by stirring at 30° C. for 12 hours. After cooling the inner temperature to 0° C. and removing excess lithium chloride and by-produced pyridine hydrochloride by filtration, the resulting liquid was analyzed by F-NMR and ion chromatography, thus finding that the ion exchange yield to the phosphoryl imide salt (1a-Li) was 29%. The results are shown in Table 4. Py.H means a tertiary ammonium cation in which a protonated form of pyridine.

[Comparative Example 4-2] [Examples 4-1 to 4-10]

While the cation of the raw material was set as tertiary ammonium in which pyridine was protonated, the anion A was changed to a, for 1, the metal salt for ion exchange was changed to lithium chloride or sodium chloride, the water content in ethyl methyl carbonate was changed to 0.7, 0.1 or 0.02% by mass, and an ion exchange treatment was performed in the same manner as in Comparative Example 4-1. The results are shown in Table 4.

Comparative Example 5-1

A phosphoryl imide salt (2a-0.5TMEDA.2H) (5.8 g, 20.0 mmol) was dissolved in ethyl methyl carbonate (water content: 1.0% by mass, 23.3 g: the amount in which the concentration of the phosphoryl imide salt (2a-0.5TMEDA.2H) charged became 20% by mass) and lithium chloride (1.0 g, 24.0 mmol, 1.2 equivalents) as a metal salt was added thereto, followed by stirring at 30° C. for 12 hours. After removing excess lithium chloride and by-produced tetramethylethylenediamine hydrochloride by filtration, the resulting liquid was analyzed by F-NMR and ion chromatography, thus finding that the ion exchange yield to the phosphoryl imide salt (1a-Li) was 25%. The results are shown in Table 5. TMEDA.2H means a tertiary ammonium cation in which protonated form of tetramethylethylenediamine with 2 equivalents of a proton is added to tetramethylethylenediamine.

[Comparative Example 5-2] [Examples 5-1 to 5-10]

While the cation of the raw material was set as tertiary ammonium in which tetramethylethylenediamine was protonated, the anion A was changed to a, h or l, the metal salt for ion exchange was changed to lithium chloride or sodium chloride, the water content in ethyl methyl carbonate was changed to 0.7, 0.1 or 0.02% by mass, and an ion exchange treatment was performed in the same manner as in Comparative Example 5-1. The results are shown in Table 5.

Comparative Example 6-1

A phosphoryl imide salt (2a-Bipy.H) (7.8 g, 20.0 mmol) was dissolved in ethyl methyl carbonate (water content: 1.0% by mass, 31.1 g: the amount in which the concentration of the phosphoryl imide salt (2a-Bipy.H) charged became 20% by mass) and lithium chloride (1.0 g, 24.0 mmol, 1.2 equivalents) as a metal salt was added thereto, followed by stirring at 30° C. for 12 hours. After removing excess lithium chloride and by-produced 2,2'-bipyridine hydrochloride by filtration, the resulting liquid was analyzed by F-NMR and ion chromatography, thus finding that the ion exchange yield to the phosphoryl imide salt (1a-Li) was 26%. The results are shown in Table 5. Bipy.H means a tertiary ammonium cation in which a protonated form of 2,2'-bipyridine.

[Comparative Example 6-2] [Examples 6-1 to 6-10]

While the cation of the raw material was set as tertiary ammonium in which 2,2'-bipyridine was protonated, the anion A was changed to a, j or l, the metal salt for ion exchange was changed to lithium chloride or sodium chloride, the water content in ethyl methyl carbonate was changed to 0.7, 0.1 or 0.02% by mass, and an ion exchange treatment was performed in the same manner as in Comparative Example 6-1. The results are shown in Table 5.

TABLE 4

| | | Counter cation | | Water content | Ion exchange |
|---|---|---|---|---|---|
| | Anion A | Raw material | Product | in solvent [% by mass] | yield [%] |
| Comparative Example 3-1 | a | Bu3N · H | Li | 1.0 | 30 |
| Comparative Example 3-2 | a | Bu3N · H | Li | 0.7 | 41 |
| Example 3-1 | a | Bu3N · H | Li | 0.1 | 90 |
| Example 3-2 | a | Bu3N · H | Li | 0.02 | 97 |
| Example 3-3 | a | Bu3N · H | Na | 0.1 | 88 |
| Example 3-4 | a | Bu3N · H | Na | 0.02 | 96 |
| Example 3-5 | d | Bu3N · H | Li | 0.1 | 88 |
| Example 3-6 | d | Bu3N · H | Li | 0.02 | 98 |
| Example 3-7 | l | Bu3N · H | Li | 0.1 | 86 |
| Example 3-8 | l | Bu3N · H | Li | 0.02 | 96 |
| Example 3-9 | l | Bu3N · H | Na | 0.1 | 83 |
| Example 3-10 | l | Bu3N · H | Na | 0.02 | 95 |
| Comparative Example 4-1 | a | Py · H | Li | 1.0 | 29 |
| Comparative Example 4-2 | a | Py · H | Li | 0.7 | 42 |
| Example 4-1 | a | Py · H | Li | 0.1 | 81 |
| Example 4-2 | a | Py · H | Li | 0.02 | 89 |
| Example 4-3 | a | Py · H | Na | 0.1 | 79 |
| Example 4-4 | a | Py · H | Na | 0.02 | 84 |
| Example 4-5 | f | Py · H | Li | 0.1 | 82 |
| Example 4-6 | f | Py · H | Li | 0.02 | 91 |
| Example 4-7 | l | Py · H | Li | 0.1 | 77 |
| Example 4-8 | l | Py · H | Li | 0.02 | 90 |
| Example 4-9 | l | Py · H | Na | 0.1 | 83 |
| Example 4-10 | l | Py · H | Na | 0.02 | 92 |

TABLE 5

| | | Counter cation | | Water content | Ion exchange |
|---|---|---|---|---|---|
| | Anion A | Raw material | Product | in solvent [% by mass] | yield [%] |
| Comparative Example 5-1 | a | TMEDA · 2H | Li | 1.0 | 25 |
| Comparative Example 5-2 | a | TMEDA · 2H | Li | 0.7 | 33 |
| Example 5-1 | a | TMEDA · 2H | Li | 0.1 | 89 |
| Example 5-2 | a | TMEDA · 2H | Li | 0.02 | 98 |
| Example 5-3 | a | TMEDA · 2H | Na | 0.1 | 83 |
| Example 5-4 | a | TMEDA · 2H | Na | 0.02 | 95 |
| Example 5-5 | h | TMEDA · 2H | Li | 0.1 | 83 |
| Example 5-6 | h | TMEDA · 2H | Li | 0.02 | 97 |
| Example 5-7 | l | TMEDA · 2H | Li | 0.1 | 82 |
| Example 5-8 | l | TMEDA · 2H | Li | 0.02 | 95 |
| Example 5-9 | l | TMEDA · 2H | Na | 0.1 | 80 |
| Example 5-10 | l | TMEDA · 2H | Na | 0.02 | 90 |
| Comparative Example 6-1 | a | Bipy · H | Li | 1.0 | 26 |
| Comparative Example 6-2 | a | Bipy · H | Li | 0.7 | 37 |
| Example 6-1 | a | Bipy · H | Li | 0.1 | 79 |
| Example 6-2 | a | Bipy · H | Li | 0.02 | 88 |
| Example 6-3 | a | Bipy · H | Na | 0.1 | 74 |
| Example 6-4 | a | Bipy · H | Na | 0.02 | 83 |
| Example 6-5 | j | Bipy · H | Li | 0.1 | 80 |
| Example 6-6 | j | Bipy · H | Li | 0.02 | 88 |
| Example 6-7 | l | Bipy · H | Li | 0.1 | 77 |
| Example 6-8 | l | Bipy · H | Li | 0.02 | 89 |
| Example 6-9 | l | Bipy · H | Na | 0.1 | 84 |
| Example 6-10 | l | Bipy · H | Na | 0.02 | 93 |

The influence of the water content of the solvent was compared by changing the anion A to a, while the cation of the raw material was set as Et3N.H, and the cation of the product was set as lithium. As a result, when the water content of the solvent is 1.0% by mass, the ion exchange yield was a low value of 29% (Comparative Example 2-1), and when the water content of the solvent is 0.7% by mass, the ion exchange yield was a low value of 35% (Comparative Example 2-2). Whereas, when the water content of the solvent was limited to 0.1% by mass, the value was significantly improved to 88% (Example 2-1). By setting the water content of the solvent at 0.02% by mass, further improvement in ion exchange yield could be confirmed (Example 2-2). Therefore, confirmation was also made using a system (0.005 and 0.0002% by mass) in which the water content of the solvent was further reduced. As a result, some effect could be confirmed when the water content of the solvent was 0.005% by mass (Example 2-3), but the ion exchange yield was slightly reduced when the water content of the solvent was 0.0002% by mass (Example 2-4).

Lithium chloride used as a metal salt for ion exchange has extremely low solubility in organic solvents other than methanol, dimethylformamide and dimethyl sulfoxide, and ethyl methyl carbonate used as a reaction solvent in the Examples also hardly dissolves lithium chloride, similarly. For this reason, it is considered that moisture contained in the solvent dissolves the metal salt (herein, lithium chloride), thus allowing the ion exchange reaction to proceed. As a result, it was presumed that the effect of proceeding the ion exchange reaction is slightly weaker than the case of 0.005% by mass and 0.02% by mass, when the amount of moisture contained in the solvent is 0.0002% by mass. This result revealed that it is not necessarily better when the solvent contains a small amount of moisture, and surprisingly, the solvent slightly containing moisture (for example, moisture in the solvent is about 0.0001 to 0.03% by mass) is better than the solvent from which moisture is completely removed (for example, less than 0.0001% by mass) from the viewpoint of the ion exchange yield.

Also in the experiment in which the anion A was changed to a, the cation of the raw material was set as Et3N.H and the product cation was set as sodium, a significant improvement in ion exchange yield could be confirmed by reducing the water content in the solvent to 0.1% by mass and 0.02% by mass from 1.0% by mass and 0.7% by mass (Comparative Examples 2-3 and 2-4, and Examples 2-5 and 2-6). However, when the water content of the solvent was reduced to 0.005% by mass and 0.0002% by mass, a slight decrease in ion exchange yield was observed as compared with the result of 0.02% by mass (Examples 2-7 and 2-8). This is because the solubility of sodium chloride used as a metal salt for ion exchange in the solvent is lower than that of lithium chloride mentioned above, and larger acceleration effect of the ion exchange reaction due to trace water content in the solvent (for example, the water content in the solvent is 0.001 to 0.05% by mass) was exhibited.

Also in the experiment in which the cation of the raw material was set as Et3N.H, the cation of the product was set as lithium, and the anion A was changed to b to 1, by limiting the water content in the solvent to 0.1% by mass or 0.02% by mass, the objective product was obtained at a high ion exchange yield of 82 to 99% (Examples 2-9 to 2-30). In the case where the anion A is 1 (Examples 2-31 and 2-32), the objective products were obtained at a high ion exchange yield in the exchange reaction to sodium cation, similar to the case where the anion A is a (Examples 2-5 and 2-6).

Also in the experiment in which cation exchange from Bu3N.H to lithium or sodium was examined using a, d or l as the anion A, by limiting the water content in the solvent to 0.1% by mass or 0.02% by mass, the objective products were obtained at a high ion exchange yield of 83 to 98% (Examples 3-1 to 3-10).

Also in the experiment in which cation exchange from Py.H to lithium or sodium was examined using a, f or l as the anion A, by limiting the water content in the solvent to 0.1% by mass or 0.02% by mass, the objective products were obtained at a high ion exchange yields of 77 to 92% (Examples 4-1 to 4-10).

Also in the experiment in which cation exchange from TMEDA.2H to lithium or sodium was examined using a, h or l as the anion A, by limiting the water content in the solvent to 0.1% by mass or 0.02% by mass, the objective products were obtained at a high ion exchange yields of 80 to 98% (Examples 5-1 to 5-10).

Also in the experiment in which the cation exchange from Bipy.H to lithium or sodium was examined using a, j or l as the anion A, by limiting the water content in the solvent to 0.1% by mass or 0.02% by mass, the objective products were obtained at a high ion exchange yields of 74 to 93% (Examples 6-1 to 6-10).

When the same anion A was used, an improvement in ion exchange yield was uniformly observed by reducing the water content in the solvent from 1.0% by mass to 0.1% by mass or less in any cation as a raw material.

Depending on the type of the tertiary ammonium salt which is the cation of the raw material, the ion exchange yield to a lithium salt or a sodium salt which is the product was slightly different. Although there is variation, it was confirmed that, when using the raw material in which the cation is Et3N H, Bu3N or TMEDA.2H, the ion exchange yield tends to increase by about 5 to 10% as compared with the case of using the raw material in which the cation is Py.H or Bipy.H. Therefore, from the viewpoint of ion exchange yield, the above $M^2$ of those in which a protonated form of a heterocyclic tertiary amine such as Py.H or Bipy.H is preferable as compared with those in which a protonated form of an aliphatic tertiary amine such as Et3N.H, Bu3N.H or TMEDA.2H.

Next, the same experiment was performed, except that an ether-based tetrahydrofuran and an ester-based ethyl propionate were respectively used as the reaction solvent in place of ethyl methyl carbonate which is a carbonate-based solvent. Examples are shown below.

Example 7-1

A phosphoryl imide salt (2a-Et3N.H) (6.7 g, 20.0 mmol) was dissolved in tetrahydrofuran (water content: 0.1% by mass, 26.7 g: the amount in which the concentration of the phosphoryl imide salt (2a-Et3N.H) charged became 20% by mass) and lithium chloride (1.0 g, 24.0 mmol, 1.2 equivalents) was added thereto as the metal salt, followed by stirring at 30° C. for 12 hours. After cooling the inner temperature to 0° C. and removing excess lithium chloride and by-produced triethylamine hydrochloride by filtration, the resulting liquid was analyzed by F-NMR and ion chromatography, thus finding that the ion exchange yield to the phosphoryl imide salt (1a-Li) was 86%. The results are shown in Table 6. THF in Table 6 means tetrahydrofuran.

Examples 7-2 and 7-3

In the same manner as in Example 7-1, except that the anion A was changed to b or l, an ion exchange treatment was performed. The results are shown in Table 6.

Example 7-4

A phosphoryl imide salt (2a-Bu3N.H) (8.4 g, 20.0 mmol) was dissolved in tetrahydrofuran (water content: 0.1% by mass, 33.5 g: the amount in which the concentration of the phosphoryl imide salt (2a-Bu3N.H) charged became 20% by mass) and lithium chloride (1.0 g, 24.0 mmol, 1.2 equivalents) was added thereto as the metal salt, followed by stirring at 30° C. for 12 hours. After cooling the inner temperature to 0° C. and removing excess lithium chloride and by-produced tributylamine hydrochloride by filtration, the resulting liquid was analyzed by F-NMR and ion chromatography, thus finding that the ion exchange yield to the phosphoryl imide salt (1a-Li) was 87%. The results are shown in Table 6.

Examples 7-5 and 7-6

In the same manner as in Example 7-4, except that the anion A was changed to f or l, an ion exchange treatment was performed. The results are shown in Table 6.

Example 7-7

A phosphoryl imide salt (2a-0.5TMEDA.2H) (5.8 g, 20.0 mmol) was dissolved in tetrahydrofuran (THF) (water content: 0.1% by mass, 23.3 g: the amount in which the concentration of the phosphoryl imide salt (2a-0.5TMEDA.2H) charged became 20% by mass) and lithium chloride (1.0 g, 24.0 mmol, 1.2 equivalents) was added thereto as the metal salt, followed by stirring at 30° C. for 12 hours. After cooling the inner temperature to 0° C. and removing excess lithium chloride and by-produced tetramethylethylenediamine hydrochloride by filtration, the resulting liquid was analyzed by F-NMR and ion chromatography, thus finding that the ion exchange yield to the phosphoryl imide salt (1a-Li) was 88%. The results are shown in Table 6.

Examples 7-8 and 7-9

In the same manner as in Example 7-7, except that the anion A was changed to h or l, an ion exchange treatment was performed. The results are shown in Table 6.

Examples 8-1 to 8-9

In the same manner as in Examples 7-1 to 7-9, except that the solvent was changed to ethyl propionate (EP), the anion A was changed to d in Example 8-2, the anion A was changed to i in Example 8-5, and anion A was changed to j in Example 8-8, an ion exchange treatment was performed. The results are shown in Table 6.

graphite as a negative electrode material, a nonaqueous secondary battery was produced in the following manner.

A positive electrode body for test was fabricated by mixing 90% by mass of a $LiNi_{1/3}Co_{1/3}Mn_{1/3}O_2$ powder with 5% by mass of polyvinylidene fluoride (hereinafter referred to as "PVDF") as a binder, and 5% by mass of acetylene black as a conductive material, further adding N-methylpyrrolidone thereto to form a paste, and applying this paste onto an aluminum foil, followed by drying.

A negative electrode body for test was fabricated by mixing 90% by mass of graphite powder with 10% by mass of PVDF as a binder, further adding N-methylpyrrolidone thereto to form a slurry, applying this slurry onto a copper foil, followed by drying at 120° C. for 12 hours.

Using a polyethylene separator impregnated with the electrolyte solution, a 50 mAh nonaqueous secondary battery with an aluminum laminate case was assembled. The resultant nonaqueous secondary battery exhibited satisfactory battery characteristics.

TABLE 6

| | Solvent | Anion A | Counter cation Raw material | Product | Water content in solvent [% by mass] | Ion exchange yield [%] |
|---|---|---|---|---|---|---|
| Example 7-1 | THF | a | Et3N•H | Li | 0.1 | 86 |
| Example 7-2 | THF | b | Et3N•H | Li | 0.1 | 86 |
| Example 7-3 | THF | l | Et3N•H | Li | 0.1 | 82 |
| Example 7-4 | THF | a | Bu3N•H | Li | 0.1 | 87 |
| Example 7-5 | THF | f | Bu3N•H | Li | 0.1 | 83 |
| Example 7-6 | THF | l | Bu3N•H | Li | 0.1 | 83 |
| Example 7-7 | THF | a | TMEDA•2H | Li | 0.1 | 88 |
| Example 7-8 | THF | h | TMEDA•2H | Li | 0.1 | 84 |
| Example 7-9 | THF | l | TMEDA•2H | Li | 0.1 | 83 |
| Example 8-1 | EP | a | Et3N•H | Li | 0.1 | 90 |
| Example 8-2 | EP | d | Et3N•H | Li | 0.1 | 93 |
| Example 8-3 | EP | l | Et3N•H | Li | 0.1 | 82 |
| Example 8-4 | EP | a | Bu3N•H | Li | 0.1 | 92 |
| Example 8-5 | EP | i | Bu3N•H | Li | 0.1 | 88 |
| Example 8-6 | EP | l | Bu3N•H | Li | 0.1 | 88 |
| Example 8-7 | EP | a | TMEDA•2H | Li | 0.1 | 91 |
| Example 8-8 | EP | j | TMEDA•2H | Li | 0.1 | 89 |
| Example 8-9 | EP | l | TMEDA•2H | Li | 0.1 | 84 |

Also in Examples 7-1 to 7-9 in which the solvent was changed to THF, by limiting the water content in the solvent to 0.3% by mass or less, the objective products were obtained at a high ion exchange yield of 82 to 88%.

Similarly, in Examples 8-1 to 8-9 in which the solvent was changed to EP, by limiting the water content in the solvent to 0.3% by mass or less, the objective products were obtained at a high ion exchange yield of 82 to 93%.

Example 1-2-1

Using a mixed solvent of ethylene carbonate, dimethyl carbonate and ethyl methyl carbonate at a volume ratio of 3:3:4 as the nonaqueous solvent, $LiPF_6$ was dissolved in the solvent so that the concentration of $LiPF_6$ as the solute in the solvent became 1.0 mol/L, and the phosphoryl imide salt (1a-Li) obtained in Example 1-2 as the phosphoryl imide salt (1) was dissolved in the solvent so that the concentration of the phosphoryl imide salt (1a-Li) based on the total amount of the nonaqueous solvent, the solute and the phosphoryl imide salt (1a-Li), to prepare a nonaqueous electrolyte solution No. 1-2-1. The preparation was performed while maintaining the liquid temperature in a range of 20 to 30° C.

Using a nonaqueous electrolyte solution No. 1-2-1, $LiNi_{1/3}Co_{1/3}Mn_{1/3}O_2$ as a positive electrode material and As mentioned above, since satisfactory ion exchange yield was obtained in the step of cation exchange, the method for producing a nonaqueous electrolyte solution in which the phosphoryl imide salt (1a-Li) obtained by the method and the solute are dissolved in the nonaqueous solvent is an efficient production method from a comprehensive viewpoint.

The method for producing a nonaqueous secondary battery in which a nonaqueous secondary battery comprising a positive electrode, a negative electrode and a nonaqueous electrolyte solution is fabricated via the method for producing the nonaqueous electrolyte solution is also an efficient production method from a comprehensive viewpoint.

Example 2-3-1

In the same manner as in Example 1-2-1, except that the phosphoryl imide salt (1a-Li) obtained in Example 2-3 is used as the phosphoryl imide salt (1), a nonaqueous electrolyte solution (nonaqueous electrolyte solution No. 2-3-1) and a nonaqueous secondary battery were fabricated, and battery characteristics were evaluated. As a result, the nonaqueous secondary battery exhibited excellent battery characteristics.

As mentioned above, since satisfactory ion exchange yield was obtained in the step of cation exchange, the method for producing an electrolyte solution in which the phosphoryl imide salt (1a-Li) obtained by the method and a solute are dissolved in a nonaqueous solvent is an efficient production method from a comprehensive viewpoint.

The method for producing a nonaqueous secondary battery in which a nonaqueous secondary battery comprising a positive electrode, a negative electrode and a nonaqueous electrolyte solution is fabricated via the method for producing the nonaqueous electrolyte solution is also an efficient production method from a comprehensive viewpoint.

Example 2-22-1

In the same manner as in Example 1-2-1, except that the phosphoryl imide salt (1h-Li) obtained in Example 2-22 is used as the phosphoryl imide salt (1), a nonaqueous electrolyte solution (nonaqueous electrolyte solution No. 2-22-1) and a nonaqueous secondary battery were fabricated, and battery characteristics were evaluated. As a result, the nonaqueous secondary battery exhibited excellent battery characteristics.

As mentioned above, since satisfactory ion exchange yield was obtained in the step of cation exchange, the method for producing an electrolyte solution in which the phosphoryl imide salt (1h-Li) obtained by the method and a solute are dissolved in a nonaqueous solvent is an efficient production method from a comprehensive viewpoint.

The method for producing a nonaqueous secondary battery in which a nonaqueous secondary battery comprising a positive electrode, a negative electrode and a nonaqueous electrolyte solution is fabricated via the method for producing the nonaqueous electrolyte solution is also an efficient production method from a comprehensive viewpoint.

[Synthesis of Raw Material: Phosphoryl Imide Salt (2h-Et3N.H-A)]

In a 2 L glass two-necked flask equipped with a dropping funnel, 700 mL of ethyl methyl carbonate (EMC) and 50.5 g (500 mmol) of difluorophosphoric acid amide ($F_2P(=O)$—$NH_2$) and 62.2 g (525 mmol, 1.05 molar equivalents) of fluorosulfonyl chloride (F—$S(=O)_2$—Cl) were charged, followed by mixing them with stirring at a rotational speed of 120 rpm for 0.1 hour. While maintaining the liquid temperature at 5° C. or lower, triethylamine (101.2 g, 1,000 mmol, 2.0 molar equivalents) was added dropwise from the dropping funnel over 2 hours and then the internal temperature was raised to 25° C., followed by stirring for 4 hours. The resulting reaction liquid was analyzed by NMR to indicate that a phosphoryl imide salt (2h-Et3N.H-A) in which the counter cation is ammonium of triethylamine was obtained with a selectivity of 75% based on difluorophosphoric acid amide as the raw material. The selectivity was calculated as follows.

(Calculation Procedure of Selectivity)

As mentioned above, by reacting difluorophosphoric acid amide as a raw material and fluorosulfonyl chloride as a raw material and performing P-NMR measurement, it is possible to quantitatively determine the objective phosphoryl imide salt (2h-Et3N.H-A) present in the reaction liquid, an excess of difluorophosphoric acid amide, and byproducts such as condensation or decomposition products of phosphoric acid amide, respectively. The selectivity was calculated from the following formula.

Selectivity (%)=area of (2h-Et3N.H-A) in reaction solution×100/(area of (2h-Et3N.H-A) in reaction solution+area of excess difluorophosphoric acid amide in reaction solution+total area of by-products in reaction solution)

Since all the phosphorus components detected by P-NMR measurement of the reaction liquid are derived from difluorophosphoric acid amide as the raw material, in other words, the above selectivity can be the value based on difluorophosphoric acid amide as the raw material.

Example 2-22-1A

In the same manner as in Example 2-22, except that the phosphoryl imide salt (2h-Et3N.H-A) as the raw material obtained above was used, an ion exchange treatment was performed. As a result, the ion exchange yield to the phosphoryl imide salt (1h-Li) was 97%.

[Synthesis of Raw Material: Phosphoryl Imide Salt (2h-Et3N.H-B)]

In a 2 L glass two-necked flask equipped with a dropping funnel, 500 mL of EMC, 101.2 g (1,000 mmol, 2.0 molar equivalent) of triethylamine and 62.2 g (525 mmol, 1.05 molar equivalents) of fluorosulfonyl chloride (F—$S(=O)_2$—Cl) were charged, followed by mixing them with stirring at a rotational speed of 120 rpm for 0.1 hour. While maintaining the liquid temperature at 5° C. or lower, a difluorophosphoric acid amide ($F_2P(=O)$—$NH_2$) solution (prepared by diluting 50.5 g (500 mmol) of difluorophosphoric acid amide with 200 mL of EMC) was added dropwise from the dropping funnel over 2 hours and then the internal temperature was raised to 25° C., followed by stirring for 4 hours. The resulting reaction liquid was analyzed by NMR to indicate that a phosphoryl imide salt (2h-Et3N.H-B) in which the counter cation was ammonium of triethylamine was obtained with a selectivity of 73% based on difluorophosphoric acid amide as the raw material.

Example 2-22-1B

In the same manner as in Example 2-22, except that the phosphoryl imide salt (2h-Et3N.H-B) as the raw material obtained above was used, an ion exchange treatment was performed. As a result, the ion exchange yield to the phosphoryl imide salt (1h-Li) was 97%.

[Synthesis of Raw Material: Phosphoryl Imide Salt (2h-Et3N.H-C)]

In a 2 L glass two-necked flask equipped with a dropping funnel, 700 mL of EMC, 101.2 g (1,000 mmol, 2.0 molar equivalents) of triethylamine and 50.5 g (500 mmol) of difluorophosphoric acid amide ($F_2P(=O)$—$NH_2$) were charged, followed by mixing with stirring at a rotational speed of 120 rpm for 0.1 hour. While maintaining the liquid temperature at 5° C. or lower, 62.2 g (525 mmol, 1.05 molar equivalents) of fluorosulfonyl chloride (F—$S(=O)_2$—Cl) was added dropwise from the dropping funnel over 2 hours and then the internal temperature was raised to 25° C., followed by stirring for 4 hours. The resulting reaction liquid was analyzed by NMR to indicate that a phosphoryl imide salt (2h-Et3N.H-C) in which the counter cation was ammonium of triethylamine was obtained with a selectivity of 40% based on difluorophosphoric acid amide as the raw material.

Example 2-22-1C

In the same manner as in Example 2-22, except that the phosphoryl imide salt (2h-Et3N.H-C) as the raw material obtained above was used, an ion exchange treatment was performed. As a result, the ion exchange yield to the phosphoryl imide salt (1h-Li) was 97%.

When a comparison is made between Examples 2-22-1A to 2-22-1C, satisfactory ion exchange yield was obtained in the subsequent step of cation exchange in all of Examples. However, in the synthesis of a phosphoryl imide salt as the raw material which is the previous step, the method for synthesis of (2h-Et3N.H-A) and (2h-Et3N.H-B) is more excellent in selectivity in the preparation of the phosphoryl imide salt as the raw material than the method for synthesis of (2h-Et3N.H-C). Therefore, from a comprehensive viewpoint, the production method of Example 2-22-1A and Example 2-22-1B is more efficient than that of Example 2-22-1C.

The invention claimed is:

1. A method for producing a phosphoryl imide salt represented by the following formula (1), comprising the step of performing cation exchange by bringing a phosphoryl imide salt represented by the following formula (2) into contact with a cation exchange resin having $M^{1\ n+}$ or a metal salt represented by the formula (4) in an organic solvent having a water content of 0.3% by mass or less:

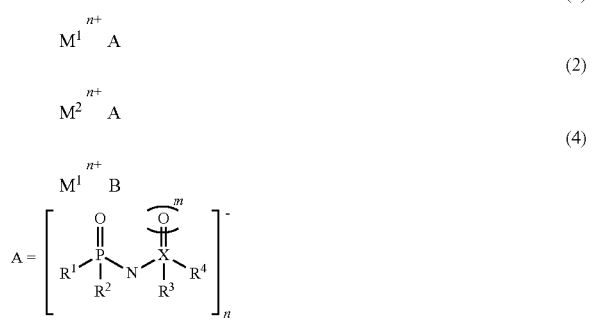

wherein $M^1$ $n^+$ is an alkali metal cation, an alkaline earth metal cation, a quaternary ammonium cation, or a quaternary phosphonium cation, $M^{2\ n+}$ is a quaternary ammonium cation, or a tertiary ammonium cation (a protonated form of a tertiary organic amine base), or a mixture thereof, a cation $M^1$ $n^+$ of the product is different from a cation $M^2$ $n^+$ of the raw material, N is a nitrogen atom, P is a phosphorus atom, and S is a sulfur atom, n is 1 or 2, B is a chloride ion, a sulfate ion, a sulfonate ion or a carbonate ion, and $R^1$, $R^2$, and $R^3$ are each independently selected from the group consisting of a fluorine atom, an alkyl group, an alkoxy group, an alkenyl group, an alkenyloxy group, an alkynyloxy group and an aryloxy group, wherein, before the step of performing the cation exchange, said method further comprises the step of:

mixing with an organic base, a mixture which has been previously prepared by mixing a phosphoric acid amide represented by the formula (a) below with a sulfonyl halide represented by the formula (b) below, or mixing with a phosphoric acid amide represented by the formula (a) below, a mixture which has been previously prepared by mixing a sulfonyl halide represented by the formula (b) below, with an organic base:

wherein $R^1$, $R^2$ and $R^3$ are as defined above.

2. The method for producing a phosphoryl imide salt according to claim 1, wherein the water content of the organic solvent is 0.05% by mass or less.

3. The method for producing a phosphoryl imide salt according to claim 1, wherein $M^1$ $^{n+}$ is a lithium ion, a sodium ion, a potassium ion, a magnesium ion, a calcium ion, a tetraalkylammonium cation, a tetraalkylphosphonium cation, an imidazolium cation, a pyrazolium cation, a pyridinium cation or a pyrimidinium cation.

4. The method for producing a phosphoryl imide salt according to claim 1, wherein $M^1$ $^{n+}$ is a lithium ion and the water content of the organic solvent is 0.0001 to 0.03% by mass.

5. The method for producing a phosphoryl imide salt according to claim 1, wherein $M^1$ $^{n+}$ is a sodium ion and the water content of the organic solvent is 0.001 to 0.05% by mass.

6. The method for producing a phosphoryl imide salt according to claim 1, wherein $M^2$ $^{n+}$ is a proton adduct of an aliphatic tertiary amine.

7. The method for producing a phosphoryl imide salt according to claim 6, wherein the proton adduct of the aliphatic tertiary amine is a proton adduct of triethylamine, a proton adduct of tri-n-butylamine or a doubly protonated adduct of tetramethylethylenediamine.

8. The method for producing a phosphoryl imide salt according to claim 1, wherein B is a chloride ion, a sulfate ion or a carbonate ion.

9. The method for producing a phosphoryl imide salt according to claim 1, wherein:

$R^1$ and $R^2$ are each independently a methoxy group or a fluorine atom, and $R^3$ is a trifluoromethyl group, a methyl group, a vinyl group, a methoxy group, a propargyloxy group, a 1,1,1,3,3,3-hexafluoroisopropoxy group, a trifluoroethoxy group or a fluorine atom.

10. The method for producing a phosphoryl imide salt according to claim 1, wherein the cation exchange resin is a cation exchange resin having a sulfonate group.

11. The method for producing a phosphoryl imide salt according to claim 1, wherein the organic solvent is at least one selected from the group consisting of carbonate esters, chain esters, ethers and ketones.

12. The method for producing a phosphoryl imide salt according to claim 11, wherein the carbonate esters are selected from the group consisting of dimethyl carbonate, ethyl methyl carbonate and diethyl carbonate, the chain esters are selected from the group consisting of methyl acetate, ethyl acetate, methyl propionate and ethyl propionate, the ethers are selected from the group consisting of tetrahydrofuran, diethylene glycol dimethyl ether, diethylene glycol diethyl ether, triethylene glycol dimethyl ether, tetraethylene glycol dimethyl ether and 1,2-dimethoxyethane, and the ketones are selected from the group consisting of acetone and ethyl methyl ketone.

13. A method for producing a nonaqueous electrolyte solution, which comprises the steps of:
(1) performing cation exchange by bringing a phosphoryl imide salt represented by the following formula (2) into contact with a cation exchange resin having $M^{1\ n+}$ or a metal salt represented by the formula (4) in an organic solvent having a water content of 0.3% by mass or less, so as to produce a phosphoryl imide salt represented by the following formula (1):

$$M^{1\ n+} A \qquad (1)$$

$$M^{2\ n+} A \qquad (2)$$

$$M^{1\ n+} B \qquad (4)$$

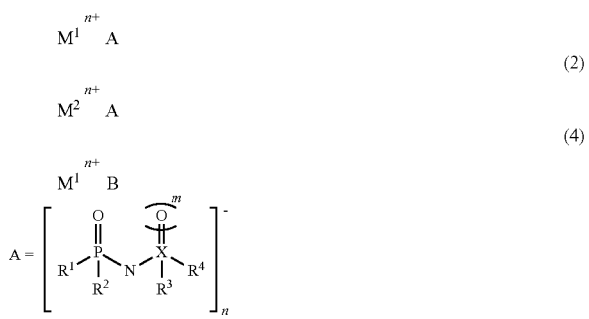

wherein $M^{1\ n+}$ is an alkali metal cation, an alkaline earth metal cation, a quaternary ammonium cation or a quaternary phosphonium cation, $M^{2\ n+}$ is a quaternary ammonium cation, or a tertiary ammonium cation (a protonated form of a tertiary organic amine base), or a mixture thereof, a cation $M^{1\ n+}$ of the product is different from a cation $M^2$ $n^+$ of the raw material, N is a nitrogen atom, P is a phosphorus atom, and S is a sulfur atom, n is 1 or 2, B is a chloride ion, a sulfate ion, a sulfonate ion or a carbonate ion, and $R^1$, $R^2$, and $R^3$ are each independently selected from the group consisting of a fluorine atom, an alkyl group, an alkoxy group, an alkenyl group, an alkenyloxy group, an alkynyloxy group and an aryloxy group, and wherein, before the step of performing the cation exchange, said method further comprises the step of:
mixing with an organic base, a mixture which has been previously prepared by mixing a phosphoric acid amide represented by the formula (a) below with a sulfonyl halide represented by the formula (b) below, or mixing with a phosphoric acid amide represented by the formula (a) below, a mixture which has been previously prepared by mixing a sulfonyl halide represented by the formula (b) below with an organic base:

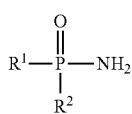

(a)

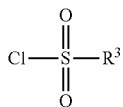

(b)

wherein $R^1$, $R^2$ and $R^3$ are as defined above; and (2) dissolving at least the resultant phosphoryl imide salt and a solute in a nonaqueous solvent.

14. The method for producing a nonaqueous electrolyte solution according to claim 13, wherein the solute is at least one selected from the group consisting of $LiPF_6$, $LiBF_4$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$, $LiSO_3F$, $NaPF_6$, $NaBF_4$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaSO_3F$, $NaN(CF_3SO_2)_2$ and $NaN(CF_3SO_2)(FSO_2)$.

15. The method for producing a nonaqueous electrolyte solution according to claim 13, wherein in step (2), an amount of the phosphoryl imide salt to be added is in a range of 0.005 to 12.0% by mass based on the total amount of the nonaqueous solvent, the solute and the phosphoryl imide salt.

16. The method for producing a nonaqueous electrolyte solution according to claim 13, wherein in step (2), further adding at least one additive selected from the group consisting of a fluorine-containing cyclic carbonate ester, an unsaturated bond-containing cyclic carbonate ester, a fluorine-containing chain carbonate ester, an ester, a cyclic sulfate ester, a cyclic sulfonate ester, an oxalatoborate, an oxalatophosphate, a difluorophosphate, a fluorosulfonate, a bissulfonyl imide salt, a bisphosphoryl imide salt, an aromatic compound, a nitrile compound and an alkylsilane.

17. The method for producing a nonaqueous electrolyte solution according to claim 13, wherein the nonaqueous solvent is at least one selected from the group consisting of a cyclic carbonate, a chain carbonate, a cyclic ester, a chain ester, a cyclic ether, a chain ether, a sulfone compound, a sulfoxide compound and an ionic liquid.

18. A method for producing a nonaqueous secondary battery, which comprises the steps of:
(1) performing cation exchange by bringing a phosphoryl imide salt represented by the following formula (2) into contact with a cation exchange resin having $M^{1\ n+}$ or a metal salt represented by the formula (4) in an organic solvent having a water content of 0.3% by mass or less, so as to produce a phosphoryl imide salt represented by the following formula (1):

$$M^{1\ n+} A \qquad (1)$$

$$M^{2\ n+} A \qquad (2)$$

$$M^{1\ n+} B \qquad (4)$$

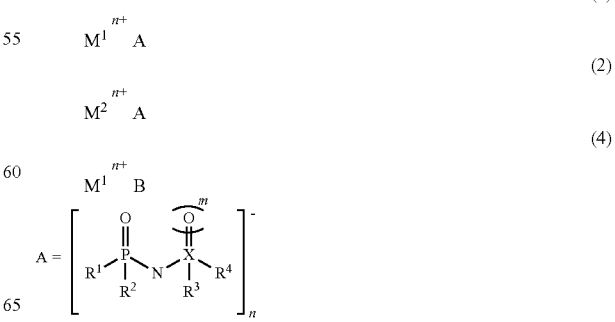

wherein $M^1{}^{n+}$ is an alkali metal cation, an alkaline earth metal cation, a quaternary ammonium cation or a quaternary phosphonium cation, $M^2{}^{n+}$ is a quaternary ammonium cation, or a tertiary ammonium cation (a protonated form of a tertiary organic amine base), or a mixture thereof, a cation $M^1{}^{n+}$ of the product is different from a cation $M^2{}^{n+}$ of the raw material, N is a nitrogen atom, P is a phosphorus atom, and S is a sulfur atom, n is 1 or 2, B is a chloride ion, a sulfate ion, a sulfonate ion or a carbonate ion, and $R^1$, $R^2$, and $R^3$ are each independently selected from a fluorine atom, an alkyl group, an alkoxy group, an alkenyl group, an alkenyloxy group, an alkynyloxy group and an aryloxy group, and wherein, before the step of performing the cation exchange, said method further comprises the step of:

mixing with an organic base, a mixture which has been previously prepared by mixing a phosphoric acid amide represented by the formula (a) below with a sulfonyl halide represented by the formula (b) below, or mixing with a phosphoric acid amide represented by the formula (a) below, a mixture which has been previously prepared by mixing a sulfonyl halide represented by the formula (b) below with an organic base:

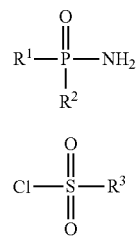

(a)

(b)

wherein $R^1$, $R^2$ and $R^3$ are as defined above;

(2) dissolving at least the resultant phosphoryl imide salt and a solute in a nonaqueous solvent, so as to produce a nonaqueous electrolyte solution; and (3) fabricating a nonaqueous secondary battery comprising a positive electrode, a negative electrode and the resultant nonaqueous electrolyte solution.

* * * * *